(12) United States Patent
Chen

(10) Patent No.: US 10,710,299 B2
(45) Date of Patent: Jul. 14, 2020

(54) STEREOLITHOGRAPHY 3D PRINTING METHOD FOR MULTIPLE LIGHT MODULES

(71) Applicants: XYZPRINTING, INC., New Taipei (TW); KINPO ELECTRONICS, INC., New Taipei (TW)

(72) Inventor: Peng-Yang Chen, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 308 days.

(21) Appl. No.: 15/698,616

(22) Filed: Sep. 7, 2017

(65) Prior Publication Data

US 2018/0339449 A1  Nov. 29, 2018

(30) Foreign Application Priority Data

May 26, 2017  (CN) .......................... 2017 1 0385817

(51) Int. Cl.
  *B29C 64/135*  (2017.01)
  *B29C 64/393*  (2017.01)
  (Continued)

(52) U.S. Cl.
  CPC .......... *B29C 64/135* (2017.08); *B29C 64/124* (2017.08); *B29C 64/129* (2017.08);
  (Continued)

(58) Field of Classification Search
  CPC ... B29C 64/124; B29C 64/129; B29C 64/135; B29C 64/277; B29C 64/282;
  (Continued)

(56) References Cited

U.S. PATENT DOCUMENTS

| 5,182,056 A | * | 1/1993 | Spence | ................. | G01J 1/4257 |
| | | | | | 264/401 |
| 6,399,010 B1 | * | 6/2002 | Guertin | .............. | G05B 19/4099 |
| | | | | | 264/401 |

(Continued)

FOREIGN PATENT DOCUMENTS

CN   106042390 A   10/2016

OTHER PUBLICATIONS

Office Action dated Mar. 2, 2020 of the corresponding China patent applicaiton.

*Primary Examiner* — Jeffrey M Wollschlager
(74) *Attorney, Agent, or Firm* — Chun-Ming Shih; HDLS IPR Services

(57) ABSTRACT

A stereolithography 3D printing method for multiple light modules includes following steps of: controlling a stereolithography 3D printer to retrieve a plurality of slice images and offsets respectively corresponding to different layers of 3D object data; selecting one of the slice images corresponding to one of the layers; adjusting an irradiation range of each of light modules according to one of the offsets corresponding to the same layer; the adjusted irradiation ranges of the light modules don't overlap with each other in a horizontal axis direction; controlling each light module to irradiate according to the adjusted irradiation range and the selected slice image; and, repeatedly executing aforementioned steps to generate a physical 3D model. Therefore, effectively implementing large size stereolithography 3D printing and manufacturing the physical 3D model without any obvious borderline can be achieved.

10 Claims, 15 Drawing Sheets

(51) Int. Cl.
*B33Y 50/02* (2015.01)
*B33Y 10/00* (2015.01)
*B29C 64/282* (2017.01)
*B29C 64/124* (2017.01)
*B29C 64/129* (2017.01)
*B29K 105/00* (2006.01)

(52) U.S. Cl.
CPC .......... *B29C 64/282* (2017.08); *B29C 64/393* (2017.08); *B33Y 10/00* (2014.12); *B33Y 50/02* (2014.12); *B29K 2105/0058* (2013.01)

(58) Field of Classification Search
CPC ....... B29C 64/393; B33Y 50/02; B33Y 10/00; B33Y 30/00; B33Y 50/00; B29K 2105/0058
See application file for complete search history.

(56) References Cited

U.S. PATENT DOCUMENTS

| | | | | |
|---|---|---|---|---|
| 6,500,378 B1 * | 12/2002 | Smith | ...................... | B29C 35/08 |
| | | | | 264/401 |
| 6,833,234 B1 * | 12/2004 | Bloomstein | ............. | B29C 64/40 |
| | | | | 264/401 |
| 8,361,376 B2 * | 1/2013 | Ito | .......................... | B33Y 70/00 |
| | | | | 264/401 |
| 8,666,142 B2 * | 3/2014 | Shkolnik | ................... | G06T 1/00 |
| | | | | 382/154 |
| 9,453,142 B2 * | 9/2016 | Rolland | ................. | B33Y 10/00 |
| 10,112,260 B2 * | 10/2018 | Crear | .................... | B23K 26/125 |
| 10,353,445 B2 * | 7/2019 | Chiriac | ................... | G06F 1/206 |
| 2005/0278056 A1 * | 12/2005 | Farnworth | .......... | G03F 7/70416 |
| | | | | 700/118 |
| 2008/0054531 A1 * | 3/2008 | Kerekes | ................. | B33Y 80/00 |
| | | | | 264/401 |
| 2010/0125356 A1 * | 5/2010 | Shkolnik | ................ | G06T 1/00 |
| | | | | 700/98 |
| 2016/0185045 A1 * | 6/2016 | Linnell | ................. | B33Y 50/02 |
| | | | | 264/401 |
| 2016/0221262 A1 * | 8/2016 | Das | ...................... | G03F 7/70416 |
| 2018/0086003 A1 * | 3/2018 | Greene | ................ | B29C 64/129 |
| 2018/0141270 A1 * | 5/2018 | Steege | .................. | B29C 64/277 |
| 2018/0222125 A1 * | 8/2018 | Wynne | ................. | B29C 64/135 |
| 2018/0243989 A1 * | 8/2018 | Cooper | ................. | B29C 64/282 |
| 2018/0281292 A1 * | 10/2018 | Podgursky | ............ | B29C 64/264 |

* cited by examiner

STEREOLITHOGRAPHY 3D PRINTING METHOD FOR MULTIPLE LIGHT MODULES

BACKGROUND OF THE INVENTION

Field of the Invention

The technical field relates to stereolithography 3D printing method and more particularly related to stereolithography 3D printing method for multiple light modules.

Description of Related Art

In the 3D printer using a liquid modeling material (such as photopolymer resin), the stereolithography (SLA) 3D printer is widely used because it has the advantages of small size, wide printing range, low cost and high printing resolution and so forth.

Please refer to FIG. 1, which is a schematic view of a stereolithography 3D printer according to the related art. A stereolithography 3D printer 1 of the related art comprises a light module 10 and a movable platform 12. A plurality of light spots 100-108 are arranged on the light module 10.

During printing, the stereolithography 3D printer 1 controls the light module 10 to move along the X-axis. The stereolithography 3D printer 1 may control the light spot 104 to irradiate the liquid modeling material upon the movable platform 12 for curing the liquid modeling material at the printing position 140 when the light module 10 moves to a printing position 140. The stereolithography 3D printer 1 may control the light spots 102-106 to irradiate the liquid modeling material upon the movable platform 12 for curing the liquid modeling material at the printing position 142 when the light module 10 moves to a printing position 142. The stereolithography 3D printer 1 may control the light spots 100-108 to irradiate the liquid modeling material upon the movable platform 12 for curing the liquid modeling material at the printing position 144 when the light module 10 moves to a printing position 144. Thus, a layer of a physical slice model is manufactured. Then, the stereolithography 3D printer 1 controls the movable platform 12 to drop a slice thickness for manufacturing next layer of a physical slice model, and so on. Finally, a physical 3D model stacked by the layers of the physical slice models is manufactured by the stereolithography 3D printer 1.

A maximum size of the physical 3D model can be manufactured by the stereolithography 3D printer 1 of the related art is closely related to the size of its light model 10. Namely, the size of the light module 10 is larger (comprising more light spots 100-108), the maximum size of the physical 3D model which 1 can be manufactured by the stereolithography 3D printer 1 is larger, and vice versa.

However, manufacture cost and manufacture difficulty of the light module 10 are increased exponentially with the size. For example, the manufacture cost and the manufacture difficulty of two light modules with size of A4 are less and lower than the manufacture cost and the manufacture difficulty of one light module with size of A3 (an area of A3 is double of an area of A4).

Due to above-mentioned restrictions, most of the stereolithography 3D printers on the market are arranged with a small size light module, and don't have not ability of printing a large size of physical 3D model.

SUMMARY OF THE INVENTION

The object of the present disclosed example is to a stereolithography 3D printing method for multiple light modules which has ability of replacing a large size large module with a plurality of small size light modules and adjusting overlapping ranges of each light module dynamically.

One of the exemplary embodiments, a stereolithography 3D printing method for multiple light modules, the stereolithography 3D printing method for multiple light modules being applied to a stereolithography 3D printer comprising a first light module and a second light module, the stereolithography 3D printing method for multiple light modules comprises following steps of: a) retrieving a plurality of slice images and offsets respectively corresponding to a plurality of layers of 3D object data, wherein a part of the offsets is the same as each other; b) selecting one of slice images; c) adjusting a first irradiation range of the first light module and a second irradiation range of the second light module according to the offset corresponding to the same layer as the selected slice image, wherein there is not overlap in a horizontal axis direction between the adjusted first irradiation range and the adjusted second irradiation range; d) controlling the first light module to irradiate based on the first irradiation range and the second light module to irradiate based on the second irradiation range for manufacturing the layer of a physical slice model according to the selected slice image; and, e) executing the steps b) to the step d) repeatedly until all of the physical slice models corresponding to the 3D object data are manufactured.

One of the exemplary embodiments, the step a) comprises following steps of: a1) retrieving the plurality of the slice images respectively corresponding to the plurality of the layers; and, a2) executing a random-number-generating process for generating a plurality of random numbers, and making the plurality of the random numbers as the offsets corresponding to the plurality of the layers.

One of the exemplary embodiments, the step a2) is configured to generate the plurality of the random numbers within a random range, wherein any two offsets respectively corresponding to two adjacent layers are different from each other.

One of the exemplary embodiments, the two offsets corresponding to the two layers separated by one layer are the same as each other.

One of the exemplary embodiments, the plurality of the offsets corresponding to the odd layers or the even layers is the same as each other.

One of the exemplary embodiments, the plurality of the offsets corresponding to the odd layers or the even layers are decreasing or increasing based on a layer number of the corresponded layer.

One of the exemplary embodiments, each offset corresponding to each layer comprises a first offset and a second offset, a sum of the first offset and the second offset corresponding to each layer is the same; wherein the step c) is configured to adjust the first irradiation range according to the first offset and the second irradiation range according to the second offset respectively.

One of the exemplary embodiments, the step c) comprises follow steps of: c1) adjusting an irradiation range of a first overlapping irradiation area of the first light module according to the first offset; and, c2) adjusting an irradiation range of a second overlapping irradiation area of the second light module according to the second offset, wherein the first overlapping irradiation area completely overlaps the second overlapping irradiation area in the horizontal axis direction, there is not overlap in the horizontal axis direction between the adjusted irradiation range of the first overlapping irradiation area and the adjusted irradiation range of the second overlapping irradiation area.

One of the exemplary embodiments, the step d) comprises following steps of: d1) controlling a first non-overlapping irradiation area of the first light module to irradiate according to a plurality of pixel values and printing positions of a plurality of pixels of the slice image; d2) controlling a second non-overlapping irradiation area of the second light module to irradiate according to the pixel values and the printing positions of the plurality of the pixels of the slice image, wherein there is not overlap in the horizontal axis direction between the first non-overlapping irradiation area and the second non-overlapping irradiation area; d3) controlling the first overlapping irradiation area to irradiate according to the pixel value of the pixel when determining that the printing position of any pixel is within the adjusted irradiation range of the first overlapping irradiation area; and, d4) controlling the second overlapping irradiation area to irradiate according to the pixel value of the pixel when determining that the printing position of any pixel is within the adjusted irradiation range of the second overlapping irradiation area.

One of the exemplary embodiments, each offset corresponding to each layer comprises a plurality of horizontal offsets; the plurality of the horizontal offsets respectively corresponds to a plurality of sub-images of the same layer of slice image.

One of the exemplary embodiments, the step c) comprises a step c3) adjusting the first irradiation range and the second irradiation range according to each horizontal offset corresponding to the same layer when printing any sub-image of the selected slice image.

One of the exemplary embodiments, the step a) is configured to load an offset table, wherein the offset table records the plurality of the offsets.

One of the exemplary embodiments, the step c) is configured to retrieve the offset corresponding to the same layer when determining that both a first maximum irradiation range of the first light module and a second maximum irradiation range of the second light module are less than a size of the selected slice image, and adjust the first irradiation range of the first light module and the second irradiation range of the second light module according to the offset corresponding to the same layer.

One of the exemplary embodiments, the stereolithography 3D printing method for multiple light modules comprises a step f) which is before the step e) after the step b), controlling the first light module or second light module which its maximum irradiation rang is not less than the size of the slice image according to the slice image for manufacturing one layer of the physical slice model corresponding to the slice image when determining that one of the first maximum irradiation rang and the second maximum irradiation rang is not less the size of the selected slice image; wherein the step e) is configured to repeatedly execute the step b) to the step d) and the step f) until all the physical slice models corresponding to the 3D object data had been manufactured.

The present disclosed example can effectively implement large size stereolithography 3D printing, and manufacture the physical 3D model without any obvious borderline.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
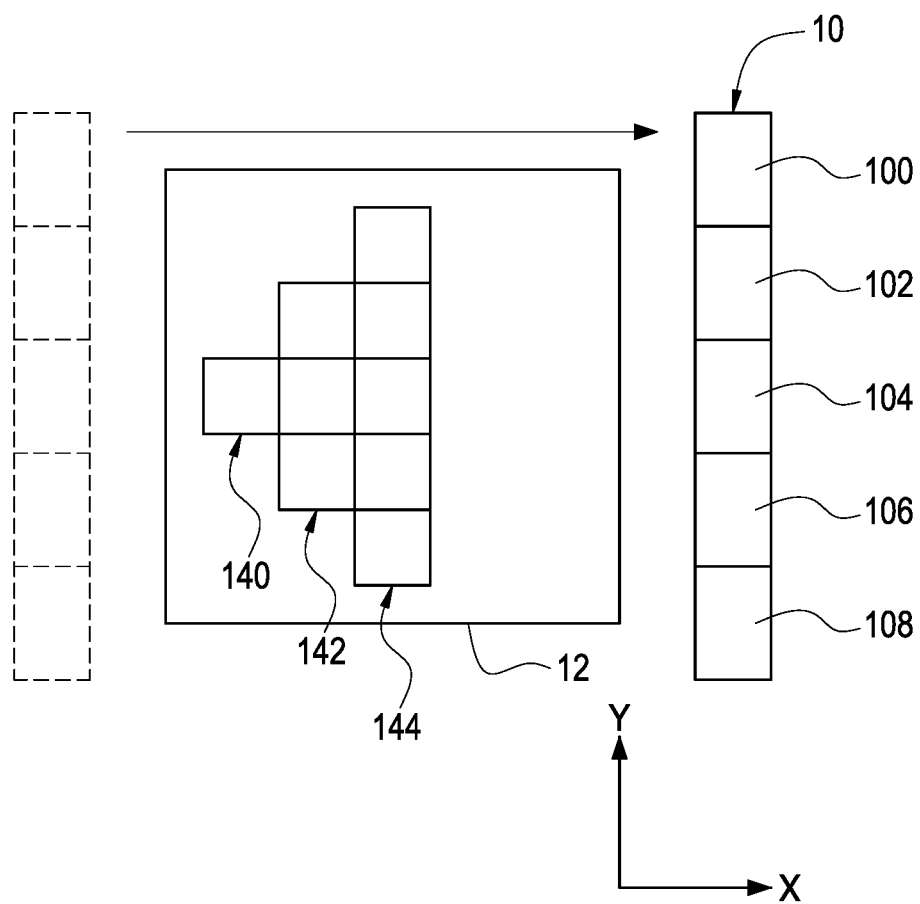
FIG. 1 is a schematic view of a stereolithography 3D printer according to the related art.
Figure 2A:
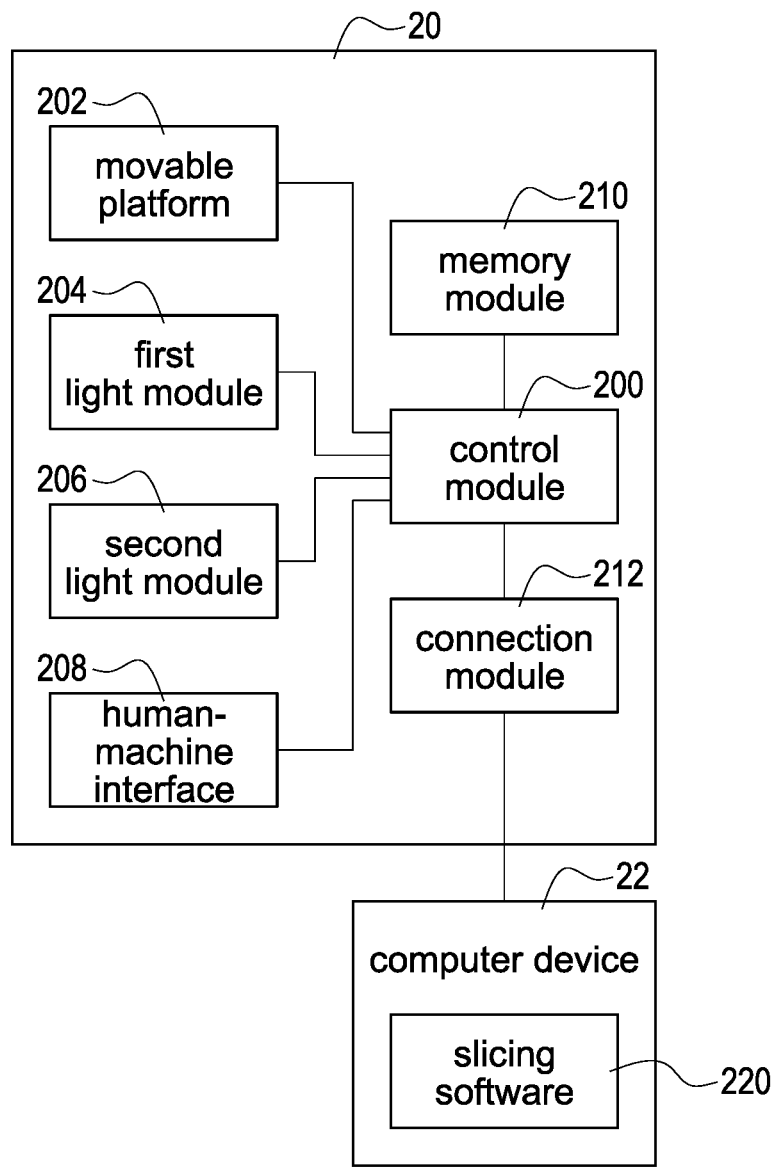
FIG. 2A is an architecture diagram of a stereolithography 3D printer according to a first embodiment of the present disclosed example.

First, please refer to FIG. 2A, which is an architecture diagram of a stereolithography 3D printer according to a first embodiment of the present disclosed example.

As shown in figure, this embodiment discloses a 3D printing system comprising a stereolithography 3D printer 20 (hereinafter the 3D printer 20) and a slicing software 220.

The slicing software 220 may be used to load 3D object data corresponding to a set of 3D object when being executed by a computer device 22 (such as desktop computer, laptop, cloud server or smartphone), and execute a slicing process to the 3D object data for generating a plurality of slice images (such as black-white images) used to stereolithography 3D printing. Above-mentioned slicing process is a common technical mean in the technical field of the 3D printing, the relevant description is omitted for brevity. Then, the 3D printer 20 may irradiate the liquid modeling material according to the plurality of the slice images for executing the stereolithography 3D printing to manufacture a physical 3D model corresponding to the 3D object.

In the other embodiment, the slicing software 220 may be stored in a memory module 210 of the 3D printer 20. A control module 200 of the 2D printer 20 may execute the slicing software 220 to load the 3D object data and execute the slicing process for generating the slice images.

Figure 2B:
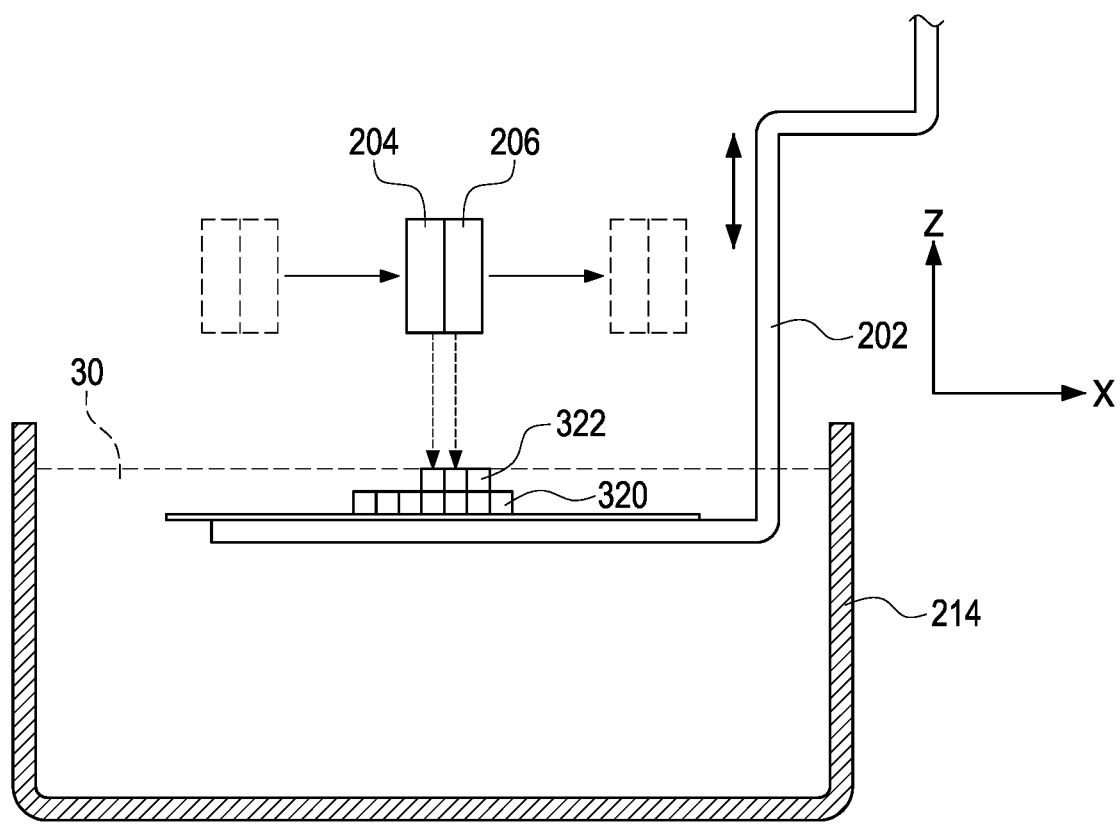
FIG. 2B is a schematic side view of a stereolithography 3D printer according to a second embodiment of the present disclosed example.

The 3D printer 20 mainly comprises the control module 200, a movable platform 202, a plurality of light modules (take two light modules, respectively named first light module 204 and second light module 206, for example in FIG. 2), a human-machine interface 208, the memory module 210, a connection module 212 and a modeling tank (such as a modeling tank 214 shown in FIG. 2B). The control module 200 is electrically connected to the movable platform 202, the first light module 204, the second light module 206, the human-machine interface 208, the memory module 210, and the connection module 212, and may control the 3D printer 20 to execute stereolithography 3D printing.

The movable platform 202 may move along a default axis direction (such as Z-axis direction) in the modeling tank 214, and is used to carry the printed physical 3D model. The first light module 204 and the second light module 206 are used to emit a light beam heading to a designated printing position in the modeling tank 214.

In one embodiment, at least one of the first light module 204 and the second light module 206 is a line light source and comprises a plurality of light spots. The control module 200 may control the light spots on the first light module 204 and the second light module 206 to turn on or off simultaneously, so the 3D printer 20 has ability of irradiating the printing positions simultaneously.

In one embodiment, at least one of the first light module 204 and the second light module 206 is a point light source (such as single point laser light transmitter). The control module 200 may control a galvanometer module (not shown in figure) to fast change the angles of multiple prisms of the galvanometer module. Thus, the 3D printer 20 may change the printing position currently irradiated by the light beam in a very short time (such as 0.01 seconds), and simulate the irradiation effect of line source or surface light source via the first light module 204 and the second light module 206.

The human-machine interface 208, such as button, display, indicator light, buzzer, or any combination of above-mentioned device, is used to receive a user's operation and output print-related information. The memory module 210 is used to store data, such as slice images or the offsets described later. The connection module 212, such as USB module, PCI bus, module, Wi-Fi module or Bluetooth module, is used to connect to the computer device 22 and receive data from the computer device 22. The modeling tank 214 is used to accommodate liquid modeling material, such as photopolymer resin (e.g. UV curable resin).

Please refer to FIG. 2B, which is a schematic side view of a stereolithography 3D printer according to a second embodiment of the present disclosed example. The embodiment of FIG. 2B takes top-illuminated stereolithography 3D printer for example and explanation.

In this embodiment, the first light module 204 and the second light module 206 respectively emit a light beam heading to the specific printing positions in the modeling tank 214.

The modeling tank 214 accommodates the liquid modeling material 30. The movable platform 202 may move along Z-axis direction under the liquid surface of the liquid modeling material 30. During the 3D printer 20 printing, a distance between the modeling surface of the movable platform 202 and the liquid surface of the liquid modeling material 30 is exact the default slice thickness. When the light beams emitted by the first light module 204 and the second light module 206 irradiate movable platform 202, the liquid modeling material 30 between the modeling surface and the liquid surface is inspired by light energy and occurs change with the air over the liquid surface, and cure into a layer of physical slice model 320. Then, the 3D printer 20 controls the movable platform 202 drop a slice thickness for printing next layer of the physical slice model 322, and so on.

In one embodiment, the first light module 204 and the second light module 206 arrange in a stagger way and don't have any overlap in any horizontal axis direction.

In the other embodiment, both the first light module 204 and the second light module 206 are line light source, such as rectangular light source device. A short edge of the first light module 204 is connected/close to a short edge of the second light module 206, so as to form a larger size of line light source.

Figure 2C:
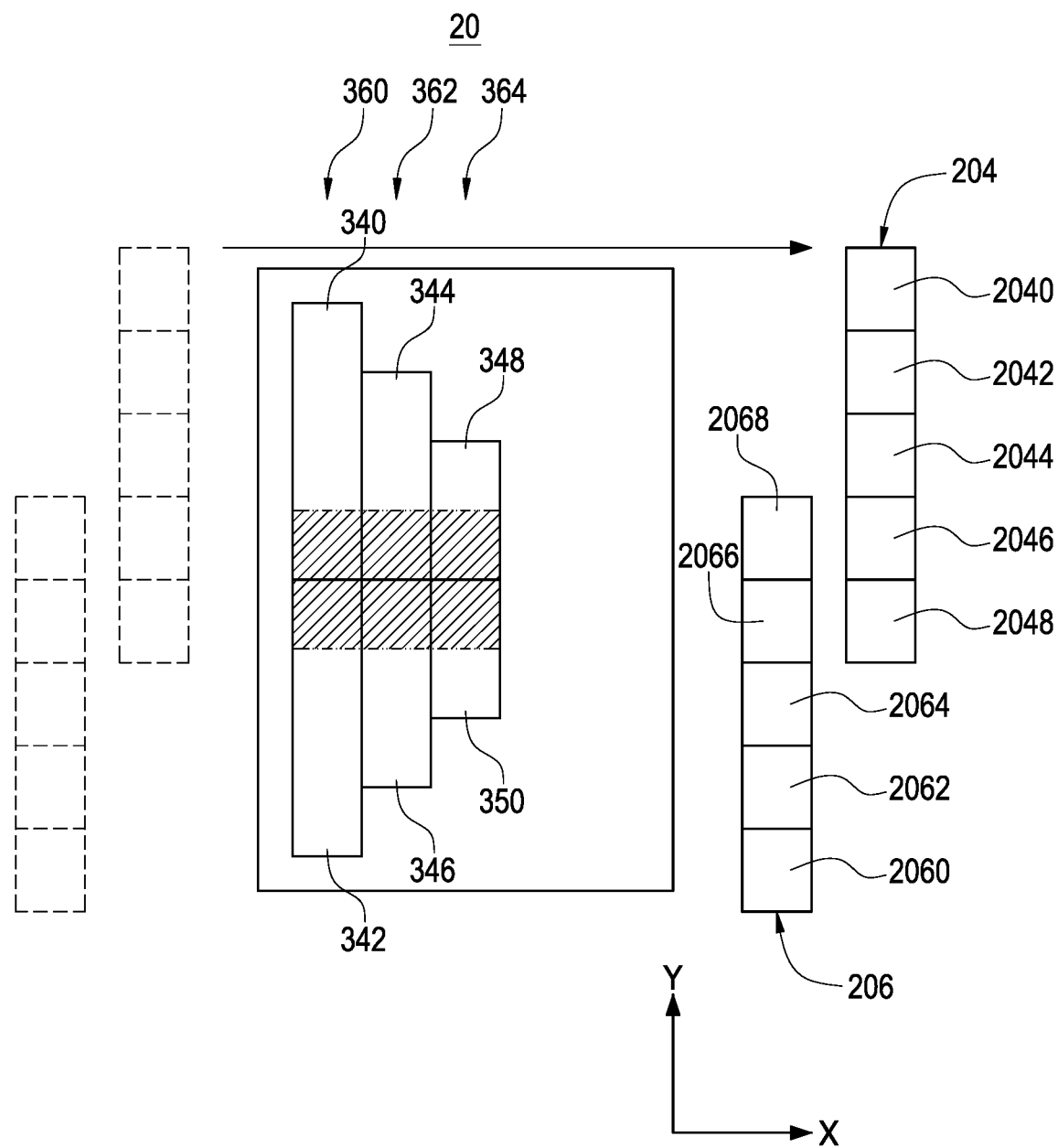
FIG. 2C is a schematic overlooking view of a stereolithography 3D printer according to a second embodiment of the present disclosed example.

Please refer to FIG. 2C simultaneously, which is a schematic overlooking view of a stereolithography 3D printer according to a second embodiment of the present disclosed example. In the embodiment of FIG. 2C, the first light module 204 and the second light module 206 arrange in a stagger way and have partial overlap in the horizontal axis direction (take the X-axis direction for example in FIG. 2C, but the horizontal axis direction may be changed into Y-axis direction in the other embodiment). Namely, there is overlap in X-axis direction between the light spot 2046 of the first light module 204 and the light spot 2068 of the second light module 206. There is overlap in X-axis direction between the light spot 2048 of the first light module 204 and the light spot 2066 of the second light module 206.

Besides, for reducing a probability of excessive curing or incompletely curing, the 3D printer 20 only enables one of the overlapped light spots to irradiate fixedly. For example, when manufacturing the physical slice model by overlapping irradiation area of the light module, the 3D printer 20 only enables light spots 2046, 2066 and disables light spots 2048, 2068. Thus, each printing position of the physical slice model manufactured by the overlapping irradiation area of the light module is irradiated only one time or less, so as to reduce the probability of excessive curing or incompletely curing.

Following description explains how to control multiple light modules to manufacture a layer of physical slice model. In the first, the 3D printer 20 controls the first light module 204 and the second light module 206 along the horizontal axis direction.

During movement, when the first light module 204 moves to the printing position 360, the 3D printer 20 may control the light spots 2040-2046 to irradiate the printing position 360 for manufacturing the partial physical slice model 340; when the second light module 206 moves to the printing position 360, the 3D printer 20 may control the light spots 2060-2066 to irradiate the printing position 360 for manufacturing the partial physical slice model 342. The combination of the partial physical slice model 340 and the partial physical slice model 342 is complete physical slice model at the printing position 360.

When the first light module 204 moves to the printing position 362, the 3D printer 20 may control the light spots 2042-2046 to irradiate the printing position 362 for manufacturing the partial physical slice model 344; when the second light module 206 moves to the printing position 362, the 3D printer 20 may control the light spots 2060-2066 to irradiate the printing position 362 for manufacturing the partial physical slice model 346. The combination of the partial physical slice model 344 and the partial physical slice model 346 is complete physical slice model at the printing position 362.

When the first light module 204 moves to the printing position 364, the 3D printer 20 may control the light spots 2044-2046 to irradiate the printing position 364 for manufacturing the partial physical slice model 348; when the second light module 206 moves to the printing position 364, the 3D printer 20 may control the light spots 2062-2066 to irradiate the printing position 364 for manufacturing the partial physical slice model 350. The combination of the partial physical slice model 348 and the partial physical slice model 350 is complete physical slice model at the printing position 364. After the first light module 204 and the second light module 206 pass though and irradiate the printing position 360, 362, 364, a layer of physical slice model consists of the partial slice physical module 340-350 can be manufactured.

This embodiment can stack the manufactured physical slice models to manufacture physical 3D model via repeatedly executing above-mentioned operation. Besides, the maximum size of the physical 3D model manufactured by the present disclosed example is larger than the size of single light model.

The present disclosed example can effectively implement the large size stereolithography 3D printing via using a splice light module joined by a plurality of small size light modules to printing.

Figure 2D:
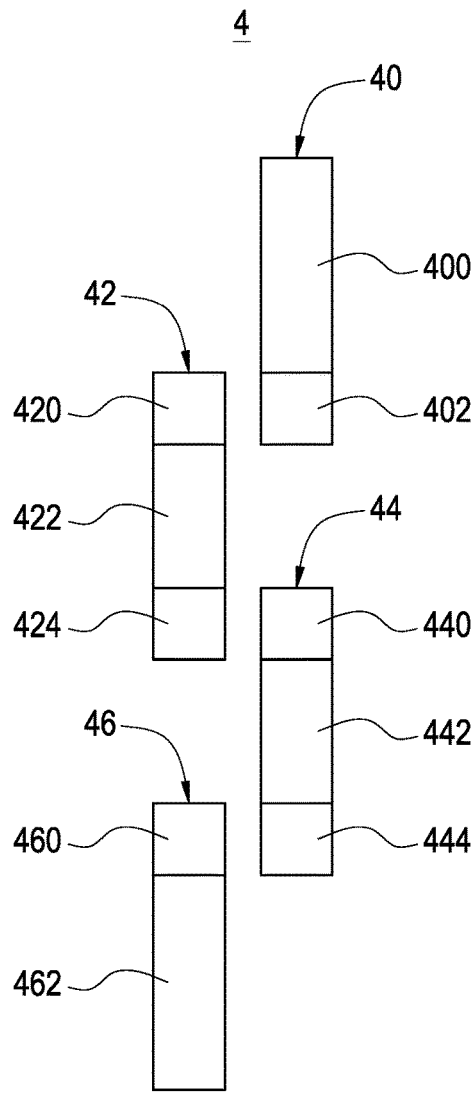
FIG. 2D is a schematic arrangement view of a stereolithography 3D printer according to a third embodiment of the present disclosed example.

Please refer to FIG. 2D, which is a schematic arrangement view of a stereolithography 3D printer according to a third embodiment of the present disclosed example. The stereolithography 3D printer 4 of this embodiment executes printing by splicing four light modules (namely, a first light module 40, a second light module 42, a third light module 44 and a fourth light module 46).

In this embodiment, the first light module 40 comprises a first non-overlapping irradiation area 400 and a first overlapping irradiation area 402. The second light module 42 comprises a second non-overlapping irradiation area 422 and second overlapping irradiation areas 420, 424. The third light module 44 comprises a third overlapping irradiation area 442 and third overlapping irradiation areas 440, 444. The fourth light module 46 comprises fourth non-overlapping irradiation area 462 and a fourth overlapping irradiation area 460. Each irradiation area comprises one or more light spot.

In this embodiment, the four light modules 40-46 arrange in a stagger left and right, and there is a partial overlap in the X-axis direction between the two adjacent light modules. As shown in FIG. 2D, there is a full overlap in the X-axis direction between the first overlapping irradiation area 402 of the first light module 40 and the second overlapping irradiation area 420 of the second light module 42. There is a full overlap in the X-axis direction between the second overlapping irradiation area 424 of the second light module 42 and the third overlapping irradiation area 440 of the third light module 44. There is a full overlap in the X-axis direction between the third overlapping irradiation area 444 of the third light module 44 and the fourth overlapping irradiation area 460 of the fourth light module 46.

The present disclosed example can effectively reduce the volume of the multiple spliced light modules via arranging the multiple light modules in a stagger left and right.

Figure 2E:
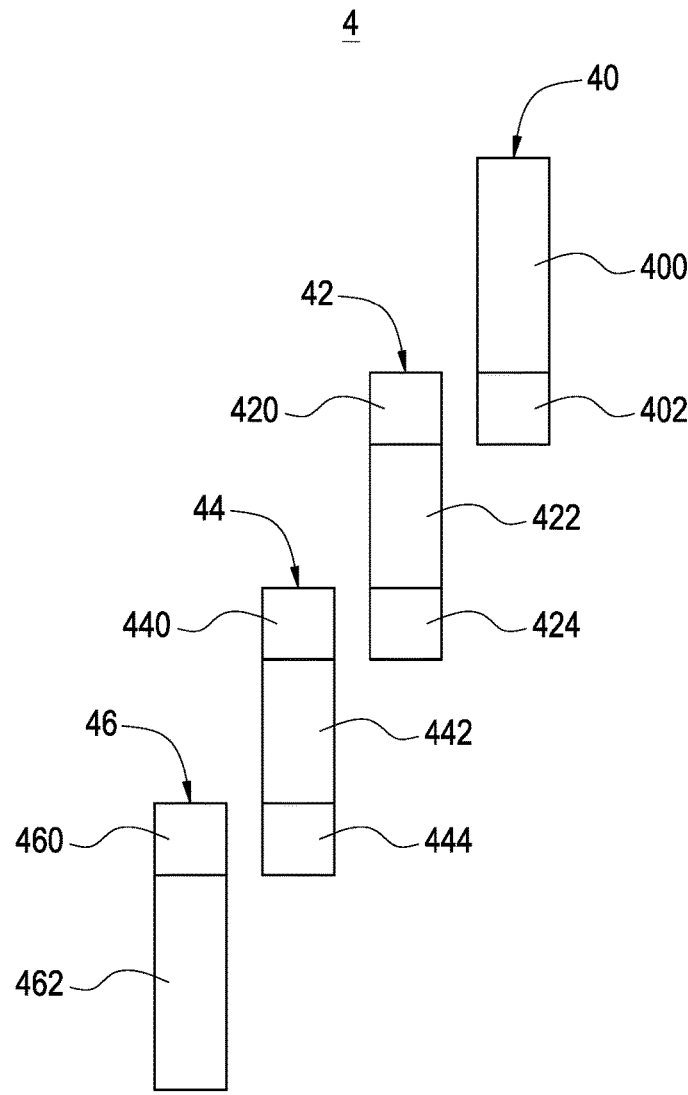
FIG. 2E is a schematic arrangement view of a stereolithography 3D printer according to a fourth embodiment of the present disclosed example.

Please refer to FIG. 2E which is a schematic arrangement view of a stereolithography 3D printer according to a fourth embodiment of the present disclosed example. Compare to the embodiment shown in FIG. 2D, the four light modules 40-46 of the stereolithography 3D printer 4 of this embodiment arrange in a stepped stagger, and there is a partial overlap in the X-axis direction between the two adjacent light modules.

The present disclosed example can make each light module have large maintenance space via arranging multiple light modules in the stepped stagger, so as to be conducive to follow-up maintenance or replacement of light source module.

Please refer to FIG. 2C, although it can reduce a probability of excessive curing or incompletely curing that irradiating via enabling one of the overlapped light spots. However, limit to an error of installation, the light spots of overlapping irradiation areas of the multiple light modules are often not completely aligned, such that each printing position of the slice physical module printed by the overlapping irradiation area of the light module occurs the status of excessive curing or incompletely curing after one-time irradiation, and the slice physical module has the obvious borderline. Besides, because above-mentioned obvious borderline locates at the same position of each layer of the slice physical module, the appearance of the physical 3D model has the obvious borderline in vertical direction, such that the printing quality is bad.

For solve above-mentioned problem, the present disclosed example provides a stereolithography 3D printing method for multiple light modules which having ability of generating the 3D physical module without the obvious borderline via changing the irradiation range dynamically.

Figure 3:
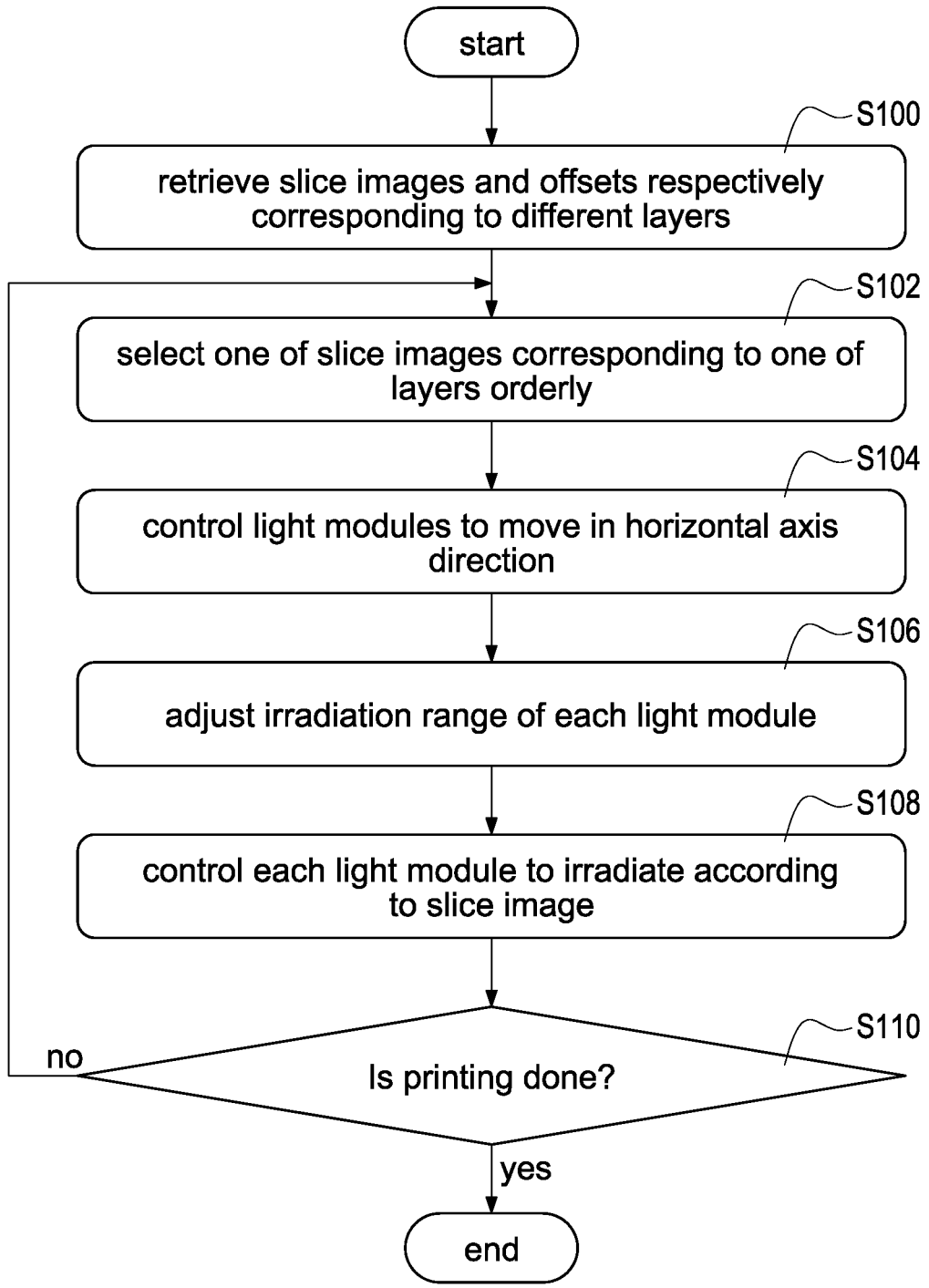
FIG. 3 is a flowchart of a stereolithography 3D printing method according to a first embodiment of the present disclosed example.

Please refer to FIG. 3 simultaneously, which is a flowchart of a stereolithography 3D printing method according to a first embodiment of the present disclosed example. The stereolithography 3D printing method for multiple light modules (hereinafter the 3D printing method) in each embodiment of the present disclosed example is mainly implemented by the 3D printer as illustrated in FIG. 2A-2E (following description take the 3D printer 20 shown in FIG. 2A-2C for explanation).

Please be noted that although the following description takes two light modules for explanation, but this specific example is not intended to limit the scope of the disclosed example. In the other embodiment, the 3D printing method of the present disclosed example may be used in the stereolithography 3D printer arranged more than two light modules (such as the 3D printer 4 shown in FIG. 2D or FIG. 2E).

In the embodiment of FIG. 3, the memory module 210 of the 3D printer 20 further stores printing software, such as firmware of the 3D printer. Above-mentioned printing software contains computer-executable program codes or machine codes. When the control module 200 executes the printing software, the control module 200 can control the 3D printer 20 to execute each step shown in FIG. 3.

Step S100: the control module 200 of the 3D printer 20 retrieves a plurality of slice images and offsets respectively corresponding to different layers of the 3D object. Each offset is used to adjust the irradiation range and respectively comprises a layer number sorted by order.

Above-mentioned slice images are generated by executing a slicing process to 3D object data corresponding to a 3D object, each slice image respectively corresponds to each slice object data generated by slicing the 3D object.

In one embodiment, each slice object, each slice image and each offset respectively comprise a layer number sorted by order.

For example, if the 3D object data may be sliced into one hundred layers of slice objects, there are one hundred slice images generated by executing the slicing process to the 3D object data. The one hundred slice image are respectively corresponded to the one hundred slice object data (layer numbers are 1 to 100), and respectively describes a shape of the corresponded slice objects.

In one embodiment, above-mentioned offsets of the layers are partial the same each other. For example, each layer of the offset is different, only the offsets of the adjacent layers (layer numbers differ by 1) are different each other, or only the offsets of the adjacent specific layers (layer numbers differ by a specific value) are different each other, and so on.

For example, in above-mentioned partially same offsets, the offsets of at least two layers separated by a layer (layer numbers differ by 2) of the layers are the same as each other. Such as the first layer of the offset (layer number is 1) is 8, the second layer of the offset is 0, the third layer of the offset is 8 (same as the offset of the first layer), the fourth layer of the offset is 3.

In another example, the offsets corresponding to the odd layers or the even layers are the same as each other. Take the offsets corresponding to the odd layers being the same as each other for example, the first layer of the offset is 3, the second layer of the offset is 0, the third layer of the offset is 3, the fourth layer of the offset is 5, the fifth layer of the offset is 3, the sixth layer of the offset is 2, and so on.

In another example, the offsets corresponding to the odd layers or the even layers are decreasing or increasing. Take the offsets corresponding to the even layers are decreasing for example, the first layer of the offset is 3, the second layer of the offset is 15, the third layer of the offset is 1, the fourth layer of the offset is 14, the fifth layer of the offset is 8, the sixth layer of the offset is 13, and so on.

Step S102: the control module 200 selects one of the slice images orderly, such as selecting the slice image of first layer.

Step S104: the control module 200 controls each light module to move along in a default horizontal axis direction. For example, the control module 200 may control the first light module 204 and second light module 206 to move in the X-axis direction to the upper side of the modeling tank 214 (take the top-illuminated stereolithography 3D printer for example).

Please be noted that the control module 200 may directly control the galvanometer module to change the angles of multiple prisms to make the light beam be irradiated to any position of the modeling tank 214 and the step S104 may not be executed when the first light module 204 and second light module 206 is the point light source.

Step S106: the control module 200 adjusts the irradiation range of each light module according to the offset corresponding to the same layer of the selected slice image. More specifically, the control module 200 adjusts the irradiation range of the overlapping irradiation area of each light module. Please be noted that, the control module 200 adjusts the irradiation range of the overlapping irradiation areas via controlling all or parts of the light spots of the overlapping irradiation area of each light module to be temporarily closed (namely, the light spots don't be turned on during irradiation).

In one embodiment, the control module 200 adjusts the first irradiation range of the first light module 204 and the second irradiation range of the second light module 206, according to the offset, so as to make the adjusted first irradiation range and the adjusted second irradiation range are not overlapped with each other in the horizontal axis direction (take X-axis direction for example).

Step S108: the control module 200 controls each light module to irradiate based on the adjusted irradiation range according to the pixel value of each pixel of the selected slice image and each printing position of the modeling task 214 corresponding to each pixel for printing one layer of physical slice models corresponding to one layer of the slice object, such as the first layer of the physical slice model corresponding to the first layer of the slice object.

For example, the control module 200 controls the first light module 204 or the second light module 206 to irradiate according to the pixel value of each pixel when each printing position corresponding to each pixel of the selected slice image enters the adjusted first irradiation range or the adjusted second irradiation range. Take the slice image being black-white image for example, the first light module 204 or the second light module 206 irradiates when the pixel value is 1, and doesn't irradiate when the pixel value is 0.

Step S110: the control module 200 determines whether the printing is completed. More specifically, the control module 200 determines whether the printing is completed according to the layer number of the currently selected slice image. Namely, the control module 200 determines whether the currently selected slice image is the last slice image of the 3D object data. The currently selected slice image being the last slice image of the 3D object data means that all the slice image of the 3D object data are selected and printed. In other words, the physical 3D model corresponding to the 3D object data had been manufactured completely.

If control module 200 determines that the printing is completed, the control module 200 terminates the 3D printing method. Otherwise, the control module 200 controls the movable platform 202 to move down if the 3D printer 20 is a top-illuminated stereolithography 3D printer a default slice thickness, and executes the steps S102-S108 again for selecting other slice image (such as the second layer of the slice image) and executes the stereolithography 3D printing continually (such as printing the second layer of the physical slice model corresponding to the second layer of the slice object data).

Via using the offsets which part of offsets are the same as each other to dynamically adjust the irradiation range of each light module when printing the different layer of the slice image, the present disclosed example can make the exterior of the manufactured physical 3D model being without the obvious borderline in the vertical direction, so as to enhance the quality of printing.

Figure 4:
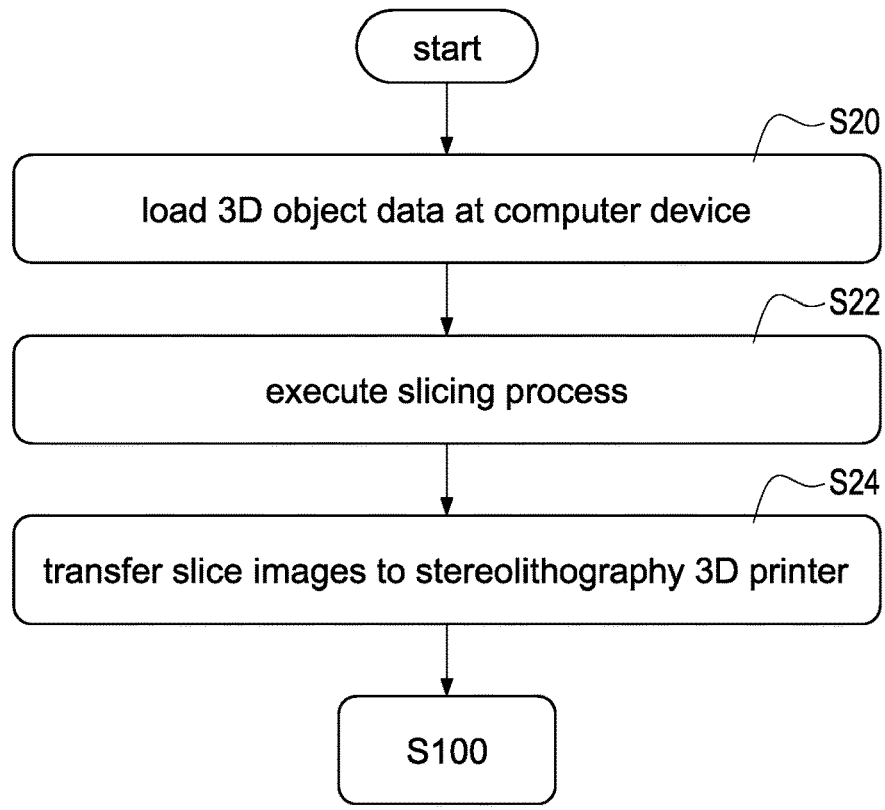
FIG. 4 is a partial flowchart of a stereolithography 3D printing method according to a second embodiment of the present disclosed example.

Please refer to FIG. 4, which is a partial flowchart of a stereolithography 3D printing method according to a second embodiment of the present disclosed example. Compare to the 3D printing method of the embodiment shown in FIG. 3, the 3D printing method of this embodiment further comprises following steps before the step S100.

Step S20: the computer device 22 loads 3D object data corresponding to a set of 3D object data after executing the slice software 220.

Step S22: the computer device 22 executes the slice process to the loaded 3D object data, for slicing the 3D object data into a plurality of slice objects, and generating the slice image (such as black-white image) corresponding to each slice object.

Step S24: the computer device 22 transfers the generated slice image to the 3D printer 20 for stereolithography 3D printing.

Figure 5:
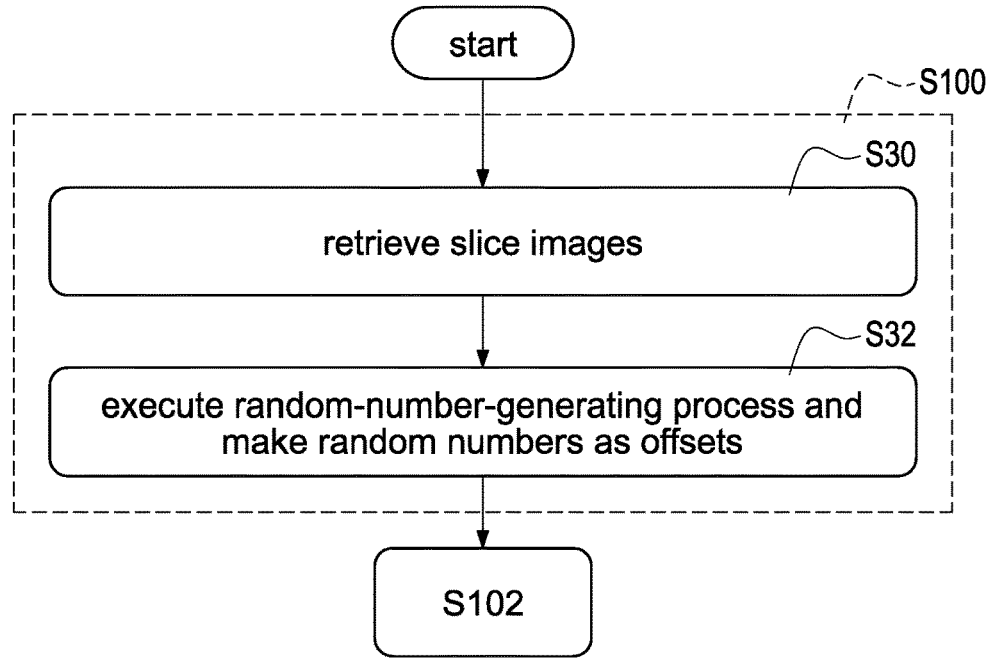
FIG. 5 is a partial flowchart of a stereolithography 3D printing method according to a third embodiment of the present disclosed example.

Please refer to FIG. 5, which is a partial flowchart of a stereolithography 3D printing method according to a third embodiment of the present disclosed example. Compare to the 3D printing method shown in the embodiment of the FIG. 3, the step S100 of the 3D printing method of this embodiment further comprises following steps.

Step S30: the control module 200 retrieves a plurality of the slice images.

Step S32: the control module 200 executes a random-number-generating process for generating a plurality of random numbers, and makes the generated random numbers as the offsets, wherein the plurality of random numbers respectively corresponds to the different layers.

In one embodiment, above-mentioned random-number-generating process generates the random numbers based on a default random range (such as 0 to 32 or −64 to 64). Besides, each two offsets of the two adjacent layers are different from each other.

Take generating random numbers based on the random range 0 to 16 for example, if the first layer of the offset is 16, the second layer of the offset must be one of the range "0 to 15", (namely, the second layer of the offset is 16). If the second layer of the offset is 8, the third layer of the offset must be one of the range "0 to 7" or "9 to 16", (namely, of the second layer of the offset is 16), and so on.

Via executing the random-number-generating process to obtain the offsets and adjusting the irradiation ranges of the light modules according to the random offsets, the present disclosed example can effectively make the positions of the borderline appeared on the different layers of the physical slice models be irregular (namely, the positions of the borderline appeared on the different layers of the physical slice models are different from each other in vertical direction), so as to make the exterior of the manufactured physical 3D model being without the obvious borderline in the vertical direction.

Figure 6:
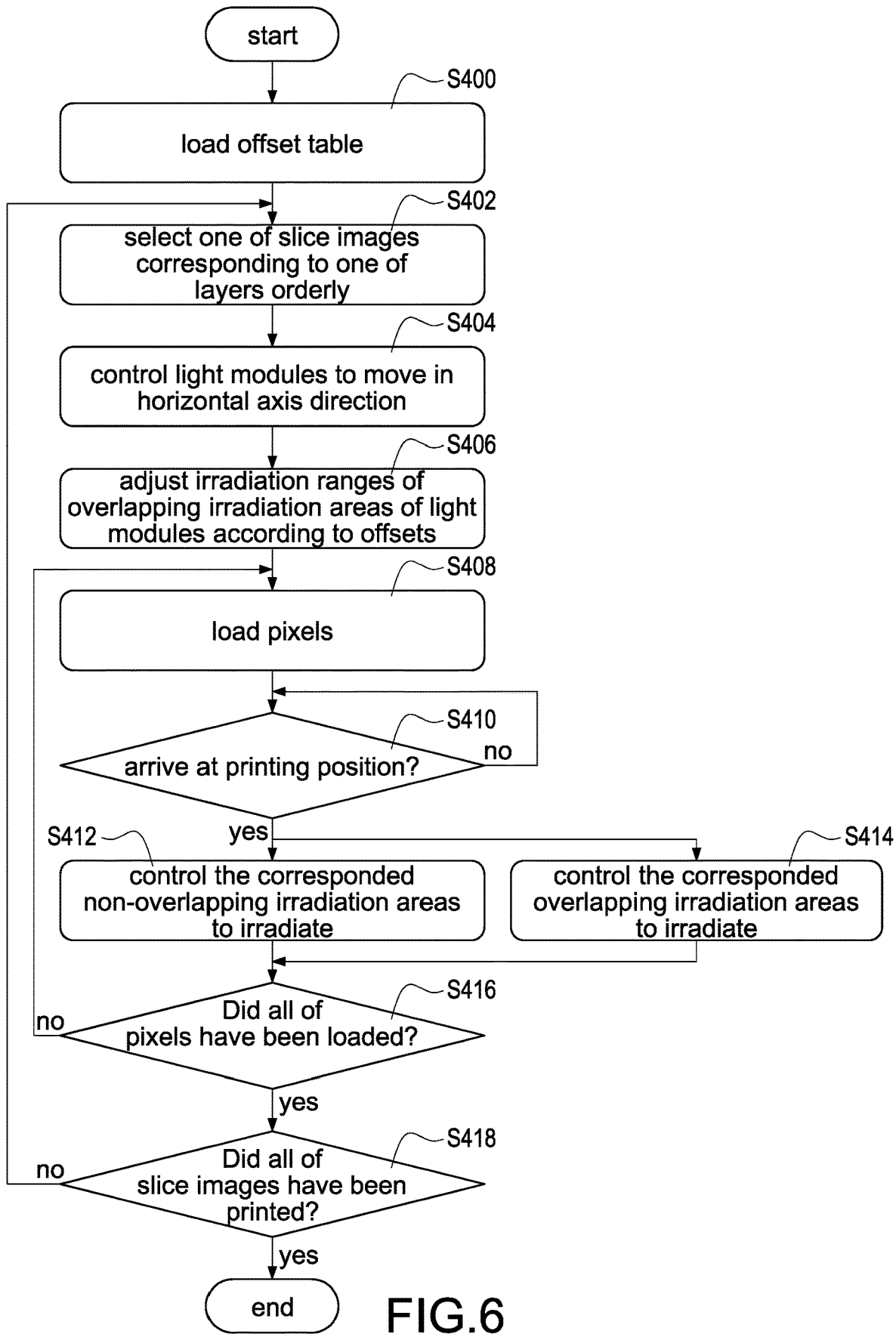
FIG. 6 is a flowchart of a stereolithography 3D printing method according to a fourth embodiment of the present disclosed example.

Please refer to FIG. 6, which is a flowchart of a stereolithography 3D printing method according to a fourth embodiment of the present disclosed example. In this embodiment, the first light module 204 comprises a first non-overlapping irradiation area and a first overlapping irradiation area, the second light module 206 comprises a second non-overlapping irradiation area and a second overlapping irradiation area, wherein the first overlapping irradiation area completely overlaps the second overlapping irradiation area in above-mentioned horizontal axis direction. The 3D printing method of this embodiment comprises following steps.

Step S400: the control module 200 loads an offset table form the memory module 210, and loads the offsets of the different layers records in the loaded offset table. More specifically, the offsets of this embodiment are set by user in advance, and be recorded in the offset table.

In one embodiment, each layer of the offset comprises each offset of each light module. Take using two light modules to irradiate for example, each layer of each offset comprises a first offset of first light module 204 and a second offset of the second light module 206. Besides, each sum of all the offsets of each layer is the same as each other. Namely, the sum of each layer of the first offset and the second offset is a fixed value. In this embodiment, above-mentioned fixed value corresponds to the sizes of the overlapping irradiation areas of the two light modules.

Step S402: the control module 200 selects one of slice images (such as selecting the first layer of the slice image) orderly.

Step S404: the control module 200 controls the first light module 204 and the second light module 206 to move along the in the default horizontal axis direction (such as X-axis direction) for starting to print the first layer of the physical slice model.

Step S406: the control module 200 adjusts the irradiation range of the first overlapping irradiation area of the first light module according to the first offset corresponding to the same layer as the selected slice image, and adjusts the irradiation range of the second overlapping irradiation area of the second light module according to the second offset corresponding to the same layer as the selected slice image. Moreover, the adjusted irradiation range of the first overlapping irradiation area doesn't overlap the adjusted irradiation range of the second overlapping irradiation area in above-mentioned horizontal axis direction. Furthermore, the control module 200 doesn't adjust the irradiation range of the first non-overlapping irradiation area and the irradiation range of the second non-overlapping irradiation area.

Step S408: the control module 200 loads a plurality of pixels of the selected slice image row by row (such as loading the first row of the pixels).

In one embodiment, a number of the pixels loaded by the control module 200 each time corresponds to the sizes of the first light module 204 and the second light module 206.

For example, if the widths of the first light module 204 and the second light module 206 are 3 light spots (namely, the first light module 204 and the second light module 206 have ability of irradiate 3 rows of the printing positions simultaneously), the control module 200 loads 3 rows of the pixels from the slice image each time.

Step S410: the control module 200 determines whether one of the first light module 204 and the second light module 206 arrivals at the printing position of the modeling task 214 corresponding to the pixel.

If the control module 200 determines that any light module (take first light module 204 for example) arrivals at the printing position corresponding to the loaded pixel, the control module 200 executes the step S412 and the step S414 simultaneously. Otherwise, the control module 200 executes the step S410 again.

Step S412: the control module 200 controls the first non-overlapping irradiation area of the first light module 204 to irradiate according to the pixel values of the first-row pixels of the first layer of the slice image.

If the control module 200 determines that the second light module 206 arrivals at the printing position corresponding to the loaded pixel in the step S410, the control module 200 controls the second non-overlapping irradiation area of the second light module 206 to irradiate according to the pixel values of the first-row pixels of the first layer of the slice image.

Step S414: the control module 200 controls the first overlapping irradiation area to irradiate according to the pixel value of this pixel when determining that one of the first-row pixels of the first layer of the slice image is within the irradiation range of the first overlapping irradiation area.

If the control module 200 determines that the second light module 206 arrivals at the printing position corresponding to the loaded pixel in the step S410, the control module 200 controls the second overlapping irradiation area to irradiate according to the pixel value of this pixel. When determining that one of the first-row pixels of the first layer of the slice image is within the irradiation range of the second overlapping irradiation area.

Via executing above-mentioned steps, the 3D printer 20 may manufactures the first row of the first layer of the physical slice model.

Step S416: the control module 200 determines whether all pixels of the first layer of the slice image had been printed.

If the control module 200 determines that all of the pixel of the first layer of the slice image had been loaded and printed, the control module 200 determines that the first layer of the physical slice model had been manufacture, and executes the step S418. Otherwise, the control module 200 executes the steps S408-S414 again for selecting the other row of the pixels (such as the second-row pixels) of the same slice image and executing the 3D stereolithography printing continually.

Step S418: the control module 200 determines whether all of slice images had been printing.

If the control module 200 determines that the printing had been completed, terminates the 3D printing method. Otherwise, the control module 200 controls the movable platform 202 to adjust the default slice thickness, and executes the step S402 again for selecting the other slice image (such as the second layer of the slice image).

Figure 8A:
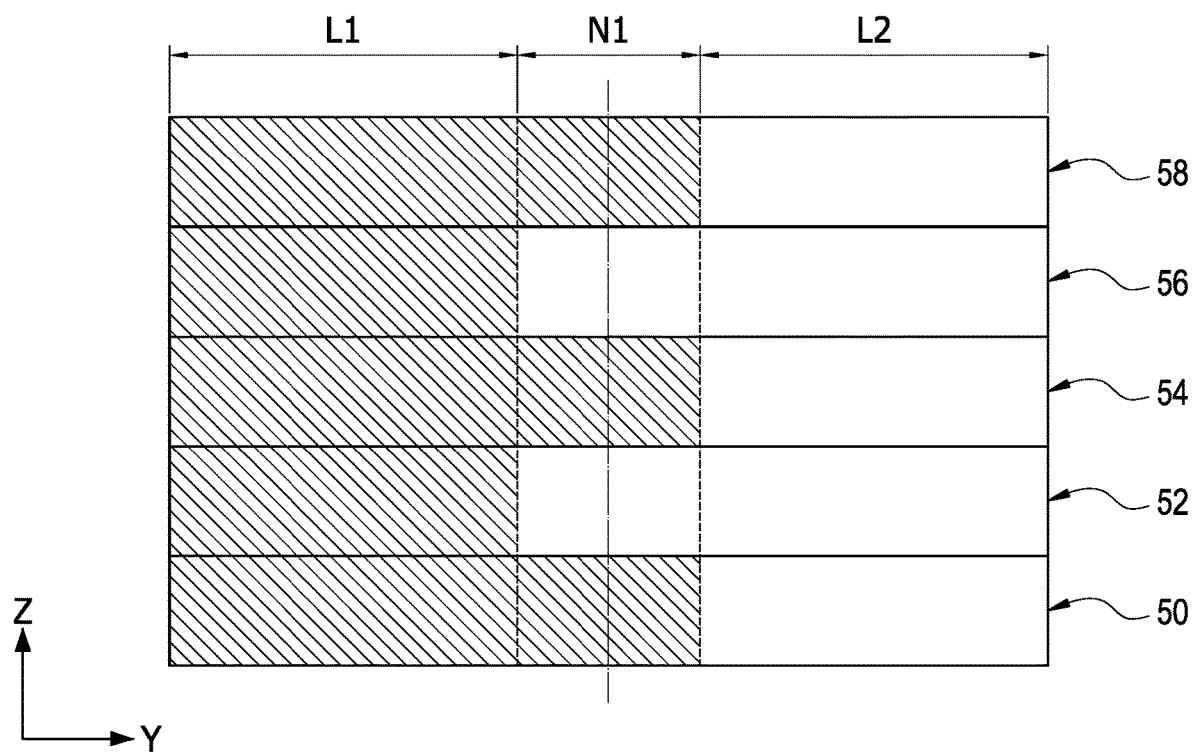
FIG. 8A is a first sectional view of an offset irradiation according to the present disclosed example.
Figure 8B:
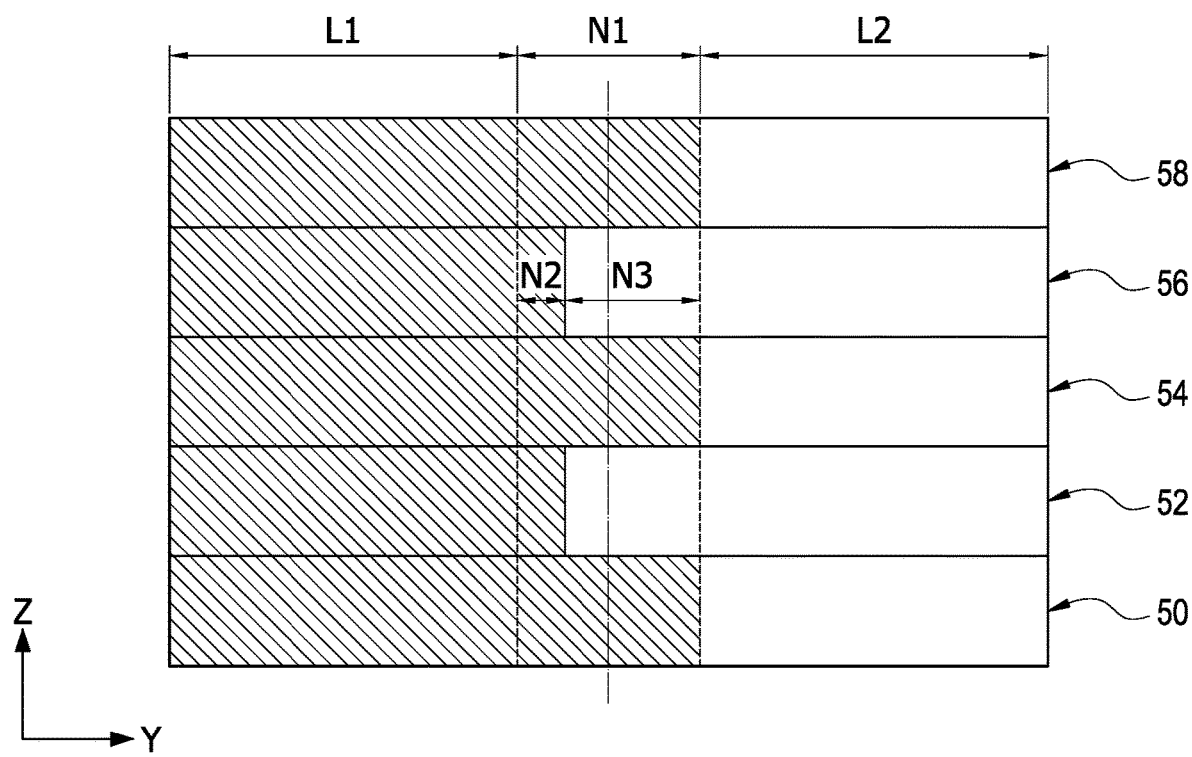
FIG. 8B is a second sectional view of an offset irradiation according to the present disclosed example.
Figure 8C:
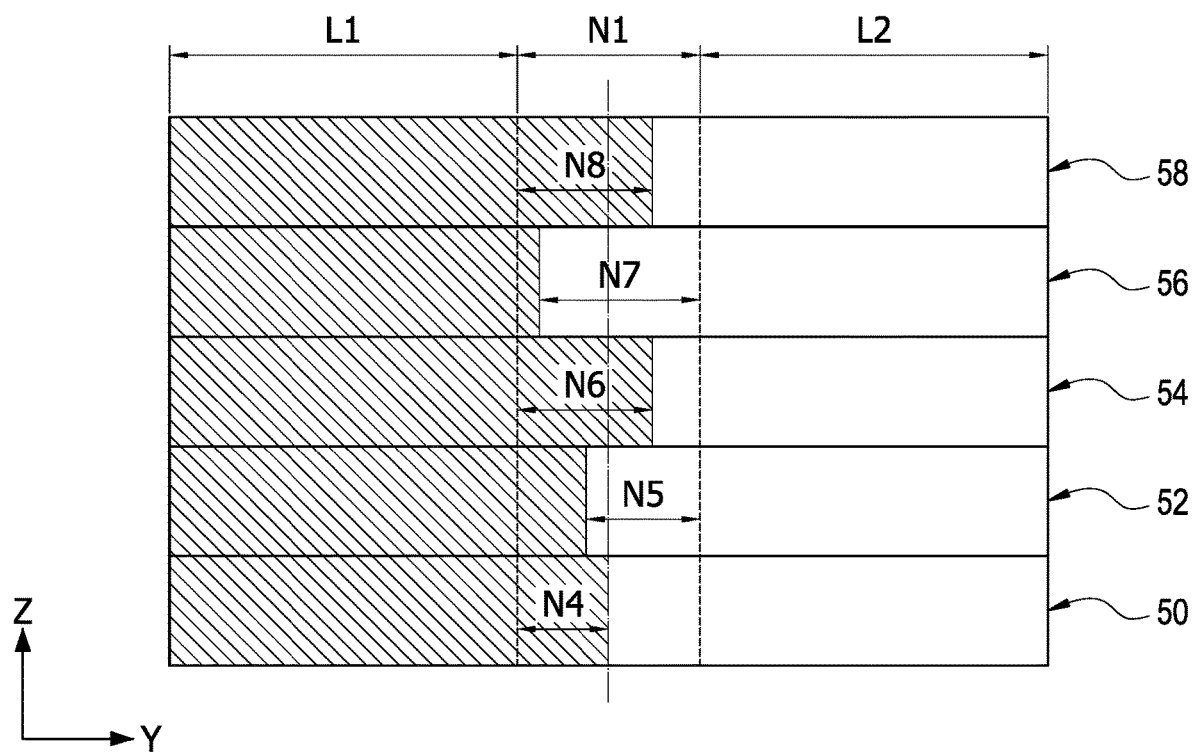
FIG. 8C is a third sectional view of an offset irradiation according to the present disclosed example.
Figure 8D:
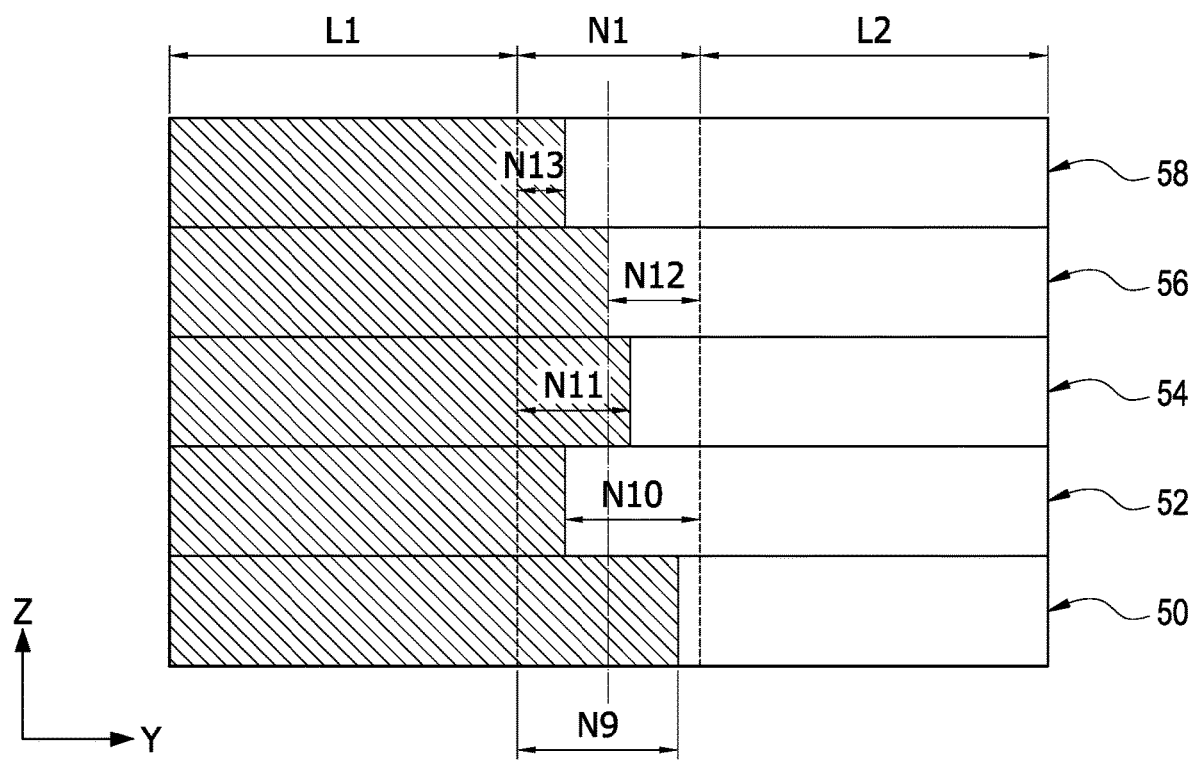
FIG. 8D is a fourth sectional view of an offset irradiation according to the present disclosed example.

Please refer to FIG. 8A to FIG. 8D simultaneously, FIG. 8A is a first sectional view of an offset irradiation according to the present disclosed example, FIG. 8B is a second sectional view of an offset irradiation according to the present disclosed example, FIG. 8C is a third sectional view of an offset irradiation according to the present disclosed example, FIG. 8D is a fourth sectional view of an offset irradiation according to the present disclosed example.

The present disclosed example further discloses four different types of variety rules of the offsets. In this example, the length of the first non-overlapping irradiation area of the first light module 204 is L1, the length of the first overlapping irradiation area of the first light module 204 is N1, the length of the second non-overlapping irradiation area of the second light module 206 is L2, and the length of the second overlapping irradiation area of the second light module 206 is N2.

In the example shown in FIG. 8A, each layer of the offset is a fixed value, N1. More specifically, the control module 200 adjusts the first irradiation range of the first light module 204 to L1+N1, and adjusts the second irradiation range of the second light module 206 to L2 when printing the first layer of the physical slice model 50. The control module 200 adjusts the first irradiation range to L1, and adjusts the second irradiation range to L2+N1 when printing the second layer of the physical slice model 52. The control module 200 adjusts the first irradiation range to L1+N1, and adjusts the second irradiation range to L2 when printing the third layer of the physical slice model 54. The control module 200 adjusts the first irradiation range to L1, and adjusts the second irradiation range to L2+N1 when printing the fourth layer of the physical slice model 56. The control module 200 adjusts the first irradiation range to L1+N1, and adjusts the second irradiation range to L2 when printing the fifth layer of the physical slice model 56. Thus, the present disclosed example can make the borderline appeared on the different positions of the adjacent layers, so as to make the borderline obscure.

In the example shown in FIG. 8B, the first offsets and the second offsets of the odd layers are N1. The first offsets of the even layers are N2, the second offsets of the even layers are N3, wherein N1 is equal to a sum of N2 and N3.

More specifically, the control module 200 adjusts the first irradiation range of the first light module 204 to L1+N1, and adjusts the second irradiation range of the second light module 206 to L2 when printing the first layer of the physical slice model 50. The control module 200 adjusts the first irradiation range to L1+N2, and adjusts the second irradiation range to L2+N3 when printing the second layer of the physical slice model 52. The control module 200 adjusts the first irradiation range to L1+N1, and adjusts the second irradiation range to L2 when printing the third layer of the physical slice model 54. The control module 200 adjusts the first irradiation range to L1+N2, and adjusts the second irradiation range to L2+N3 when printing the fourth layer of the physical slice model 56. The control module 200 adjusts the first irradiation range to L1+N1, and adjusts the second irradiation range to L2 when printing the fifth layer of the physical slice model 58. Thus, the present disclosed example can make the borderline appeared on the different positions of the adjacent layers, so as to make the borderline obscure.

In the example shown in FIG. 8C, each layer of each offset is generated randomly. In this example, the first layer of the offset is N4, the second layer of the offset is N5, the third layer of the offset is N6, the fourth layer of the offset is N7, and the fifth layer of the offset is N8. Furthermore, the offsets of the adjacent layers are used in the different light modules alternatively.

More specifically, the control module 200 adjusts the first irradiation range of the first light module 204 to L1+N4, and adjusts the second irradiation range of the second light module 206 to L2+N1−N4 when printing the first layer of the physical slice model 50. The control module 200 adjusts the first irradiation range to L1+N1−N5, and adjusts the second irradiation range to L2+N5 when printing the second layer of the physical slice model 52. The control module 200 adjusts the first irradiation range to L1+N6, and adjusts the second irradiation range to L2+N1−N6 when printing the third layer of the physical slice model 54. The control module 200 adjusts the first irradiation range to L1+N1−N7, and adjusts the second irradiation range to L2+N7 when printing the fourth layer of the physical slice model 56. The control module 200 adjusts the first irradiation range to L1+N8, and adjusts the second irradiation range to L2+N1−N8 when printing the fifth layer of the physical slice model 58. Thus, the present disclosed example can make the positions of the borderline appeared on the different layers be irregular via using the random offsets to adjust irradiation ranges, so as to make the borderline obscure.

In the example shown in FIG. 8D, the offsets of the layers are decreasing. In this example, the first layer of the offset is N9, the second layer of the offset is N10, the third layer of the offset is N11, the fourth layer of the offset is N12, the fifth layer of the offset is N13, wherein N9 is larger than N10, N10 is larger than N11, N11 is larger than N12, and N12 is larger than N13. Furthermore, the offsets of the adjacent layers are used in the different light modules alternatively.

More specifically, the control module 200 adjusts the first irradiation range of the first light module 204 to L1+N9, and adjusts the second irradiation range of the second light module 206 to L2+N1−N9 when printing the first layer of the physical slice model 50. The control module 200 adjusts the first irradiation range to L1+N1−N10, and adjusts the second irradiation range to L2+N10 when printing the second layer of the physical slice model 52. The control module 200 adjusts the first irradiation range to L1+N11, and adjusts the second irradiation range to L2+N1−N11 when printing the third layer of the physical slice model 54. The control module 200 adjusts the first irradiation range to L1+N1−N12, and adjusts the second irradiation range to L2+N12 when printing the fourth layer of the physical slice model 56. The control module 200 adjusts the first irradiation range to L1+N13, and adjusts the second irradiation range to L2+N1−N13 when printing the fifth layer of the physical slice model 58. Thus, the present disclosed example can form an obvious variation between each position of the borderline of each layer via using the decreasing offsets to adjust the irradiation ranges, so as to make the borderline obscure.

In above-mentioned embodiment, the present disclosed example make the positions of the borderline appeared on the different layers different in vertical direction, so as to make the borderline forming on the physical slice models in vertical direction obscure. However, even the 3D printer 20 prints by using above-mentioned schema, there is the obvious borderline appeared on the physical slice model of the same layer in horizontal direction.

For solving above-mentioned problem, the present disclosed example further discloses a stereolithography 3D printing method for multiple light modules which has ability of manufacturing the physical 3D model without the obvious borderline in horizontal direction via dynamically changing the irradiation range during printing each layer of the physical slice model.

Figure 7:
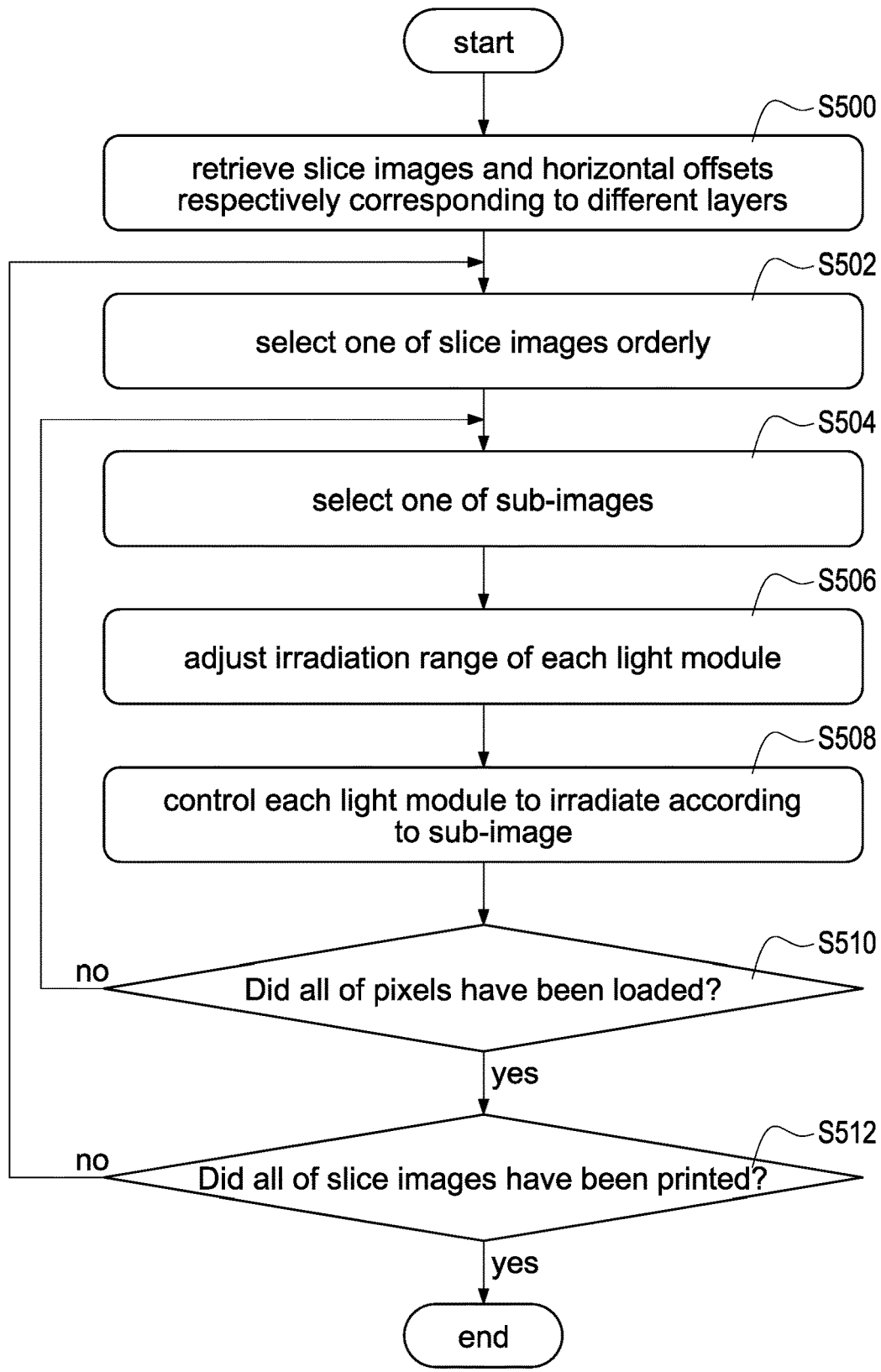
FIG. 7 is a flowchart of a stereolithography 3D printing method according to a fifth embodiment of the present disclosed example.

Please refer to FIG. 7, which is a flowchart of a stereolithography 3D printing method according to a fifth embodiment of the present disclosed example. The 3D printing method of this embodiment comprises following steps.

Step S500: the control module 200 retrieves a plurality of layers of slice images, and retrieves the plurality of the layers of the offsets. More specifically, each layer of the offset respectively comprises a plurality of horizontal offsets, the horizontal offsets respectively corresponds to a plurality of sub-images of the same layer of the slice image. For example, each sub-image may be a row of pixels. The size of each sub-image may be determined by the size of the first light module 204 and the size of the second light module 206.

Step S502: the control module 200 selects one of the slice images (such as the first layer of slice image) orderly.

Step S504: the control module 200 selects one of the sub-images of the selected slice image (such as the sub-image composited by the first row of the pixels of the slice image).

Step S506: the control module 200 adjusts the first irradiation range of the first light module 204 and the second irradiation range of the second light module 206 according to the same layer of the plurality of the horizontal offsets.

Step S508: the control module 200 controls the first light module 204 to irradiate according to the adjusted first irradiation range and the second light module 206 to irradiate according to the adjusted second irradiation range according to each pixel value of each pixel of the selected sub-image for manufacturing part of physical slice model (such as the first row of the physical slice model) when determining that 3D printer is ready to print the selected sub-image (such as the first light module 204 or the second light module 206 has been moved to the corresponded printing position).

Step S510: the control module 200 determines whether all of the sub-images of the first layer of the slice image had been printed completely.

If the control module 200 determines that the all of the sub-images had been printed, determines that the first layer of the slice image had been printed, and executes the step S512. Otherwise, the control module 200 executes the steps S504-S508 again for selecting the other sub-images of the same layer of the slice image (such as selecting the sub-image composited by the second row of the pixels of the slice image) and executing the stereolithography 3D printing continually.

Step S512: the control module 200 determines whether the printing has completed. Namely, the control module 200 determines whether all of the slice images had been printed completely.

If the control module 200 determines that all of the slice images had been printed, the control module 200 terminates the 3D printing method. Otherwise, the control module 200 controls the movable platform 202 to adjust the default slice thickness, and executes the step S502 again for selecting the other slice image (such as the second layer of the slice image) and executing the stereolithography 3D printing continually.

Figure 9A:
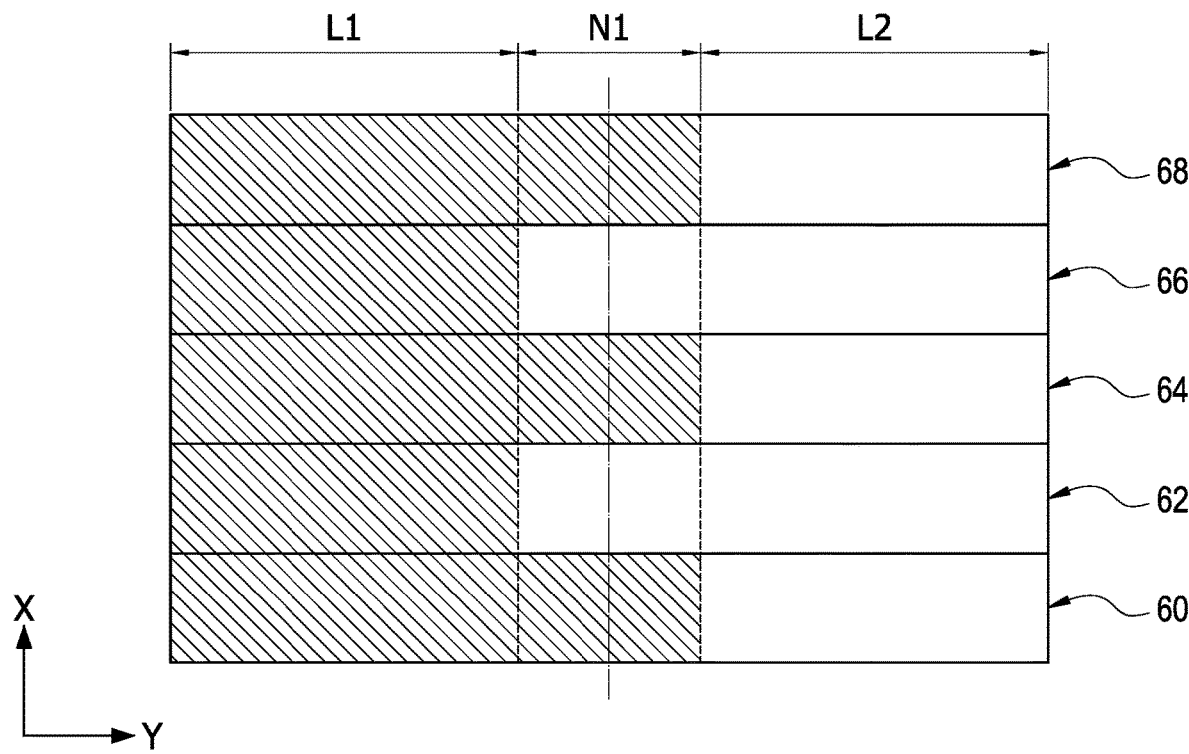
FIG. 9A is a first overlooking view of an offset irradiation according to the present disclosed example.
Figure 9B:
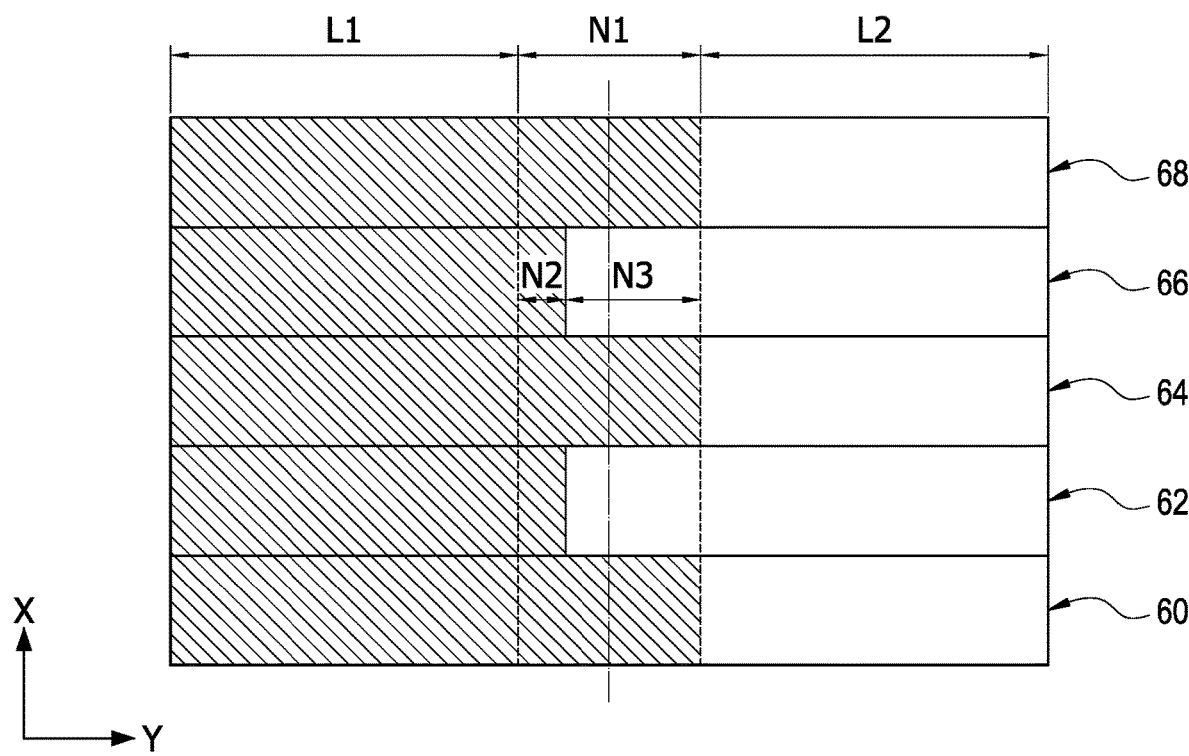
FIG. 9B is a second overlooking view of an offset irradiation according to the present disclosed example.
Figure 9C:
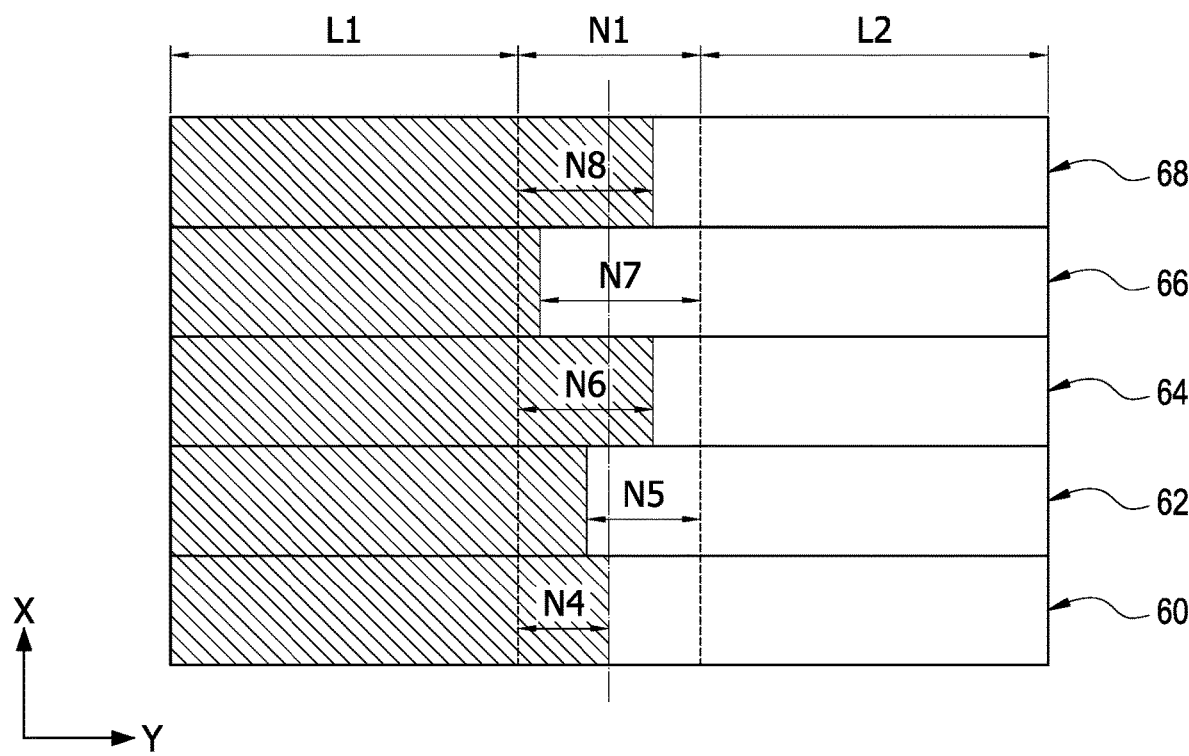
FIG. 9C is a third overlooking view of an offset irradiation according to the present disclosed example.
Figure 9D:
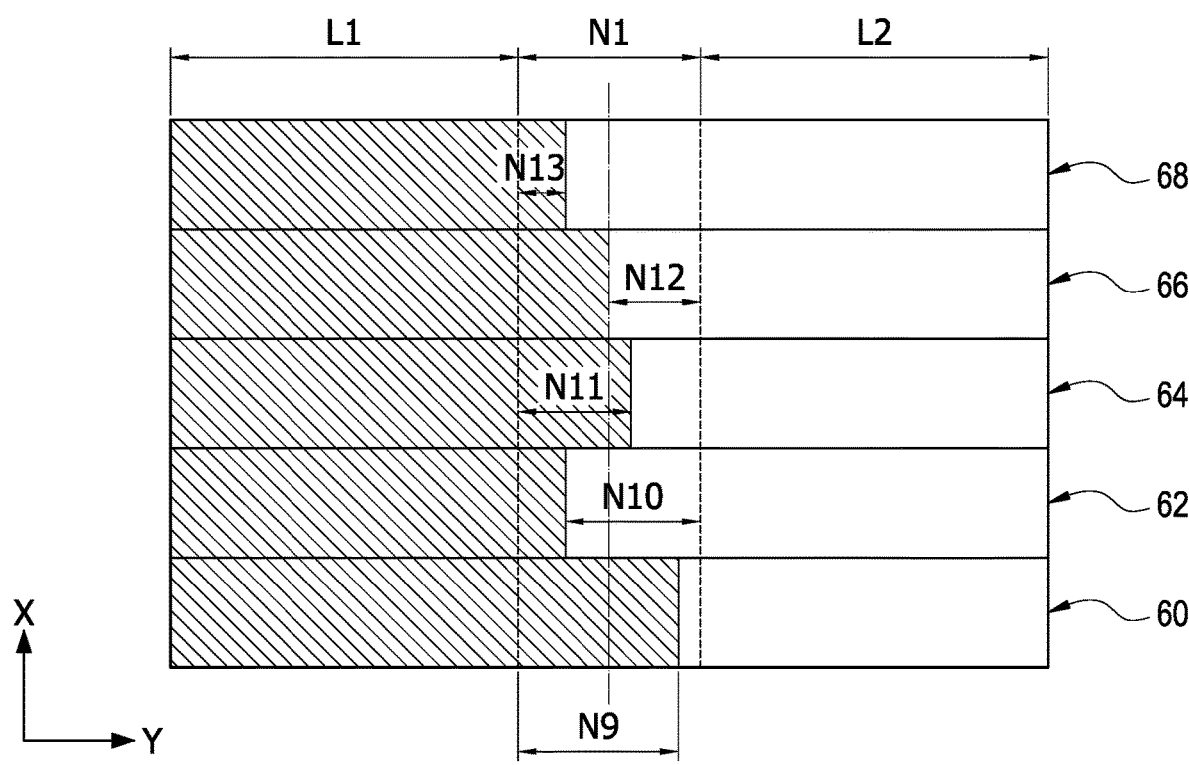
FIG. 9D is a fourth overlooking view of an offset irradiation according to the present disclosed example.

Please refer to FIG. 9A to FIG. 9D simultaneously, FIG. 9A is a first overlooking view of an offset irradiation according to the present disclosed example, FIG. 9B is a second overlooking view of an offset irradiation according to the present disclosed example, FIG. 9C is a third overlooking view of an offset irradiation according to the present disclosed example, FIG. 9D is a fourth overlooking view of an offset irradiation according to the present disclosed example.

FIG. 9A to FIG. 9D respectively correspond to FIG. 8A to FIG. 8D. Besides, the variety rules of the offsets shown in FIG. 9A to FIG. 9D are respectively same as the variety rules of the offsets shown in FIG. 8A to FIG. 8D. The difference between FIG. 9A to FIG. 9D and FIG. 8A to FIG. 8D is that the embodiment shown in FIG. 8A to FIG. 8D adjusts the irradiation ranges used to irradiate the different layers according to the offsets, the embodiment shown in FIG. 9A to FIG. 9D adjusts the irradiation ranges used to irradiate the different positions in the same layer according to the offsets.

In the example shown in FIG. 9A, the control module 200 adjusts the first irradiation range of the first light module 204 to L1+N1, and adjusts the second irradiation range of the second light module 206 to L2 when printing the first sub-image 60 in one layer. The control module 200 adjusts the first irradiation range to L1, and adjusts the second irradiation range to L2+N1 when printing the second sub-image 62 in the same layer. The control module 200 adjusts the first irradiation range to L1+N1, and adjusts the second irradiation range to L2 when printing the third sub-image 64 in the same layer. The control module 200 adjusts the first irradiation range to L1, and adjusts the second irradiation range to L2+N1 when printing the fourth sub-image 66 in the same layer. The control module 200 adjusts the first irradiation range to L1+N1, and adjusts the second irradiation range to L2 when printing the fifth sub-image 68 in the same layer.

In the example shown in FIG. 9B, the control module 200 adjusts the first irradiation range of the first light module 204 to L1+N1, and adjusts the second irradiation range of the second light module 206 to L2 when printing the first sub-image 60 in one layer. The control module 200 adjusts the first irradiation range to L1+N2, and adjusts the second irradiation range to L2+N3 when printing the second sub-image 62 in the same layer. The control module 200 adjusts the first irradiation range to L1+N1, and adjusts the second irradiation range to L2 when printing the third sub-image 64 in the same layer. The control module 200 adjusts the first irradiation range to L1+N2, and adjusts the second irradiation range to L2+N3 when printing the fourth sub-image 66 in the same layer. The control module 200 adjusts the first irradiation range to L1+N1, and adjusts the second irradiation range to L2 when printing the fifth sub-image 68 in the same layer.

In the example shown in FIG. 9C, the control module 200 adjusts the first irradiation range of the first light module 204 to L1+N4, and adjusts the second irradiation range of the second light module 206 to L2+N1−N4 when printing the first sub-image 60 in one layer. The control module 200 adjusts the first irradiation range to L1+N1−N5, and adjusts the second irradiation range to L2+N5 when printing the second sub-image 62 in the same layer. The control module 200 adjusts the first irradiation range to L1+N6, and adjusts the second irradiation range to L2+N1−N6 when printing the third sub-image 64 in the same layer. The control module 200 adjusts the first irradiation range to L1+N1−N7, and adjusts the second irradiation range to L2+N7 when printing the fourth sub-image 66 in the same layer. The control module 200 adjusts the first irradiation range to L1+N8, and adjusts the second irradiation range to L2+N1−N8 when printing the fifth sub-image 68 in the same layer.

In the example shown in FIG. 9D, the control module 200 adjusts the first irradiation range of the first light module 204 to L1+N9, and adjusts the second irradiation range of the second light module 206 to L2+N1−N9 when printing the first sub-image 60 in one layer. The control module 200 adjusts the first irradiation range to L1+N1−N10, and adjusts the second irradiation range to L2+N10 when printing the second sub-image 62 in the same layer. The control module 200 adjusts the first irradiation range to L1+N11, and adjusts the second irradiation range to L2+N1−N11 when printing the third sub-image 64 in the same layer. The control module 200 adjusts the first irradiation range to L1+N1−N12, and adjusts the second irradiation range to L2+N12 when printing the fourth sub-image 66 in the same layer. The control module 200 adjusts the first irradiation range to L1+N13, and adjusts the second irradiation range to L2+N1−N13 when printing the fifth sub-image 68 in the same layer.

The present disclosed example can make the borderline appeared on the different positions of each layer of the physical slice model in horizontal direction, so as to make the borderline in horizontal direction obscure.

Please be noted that although the 3D printer controls the multiple light modules to irradiate for manufacturing the physical 3D model simultaneously during the stereolithography 3D printing of above-mentioned embodiments, but this specific example is not intended to limit the scope of the present disclosed example.

Figure 10:
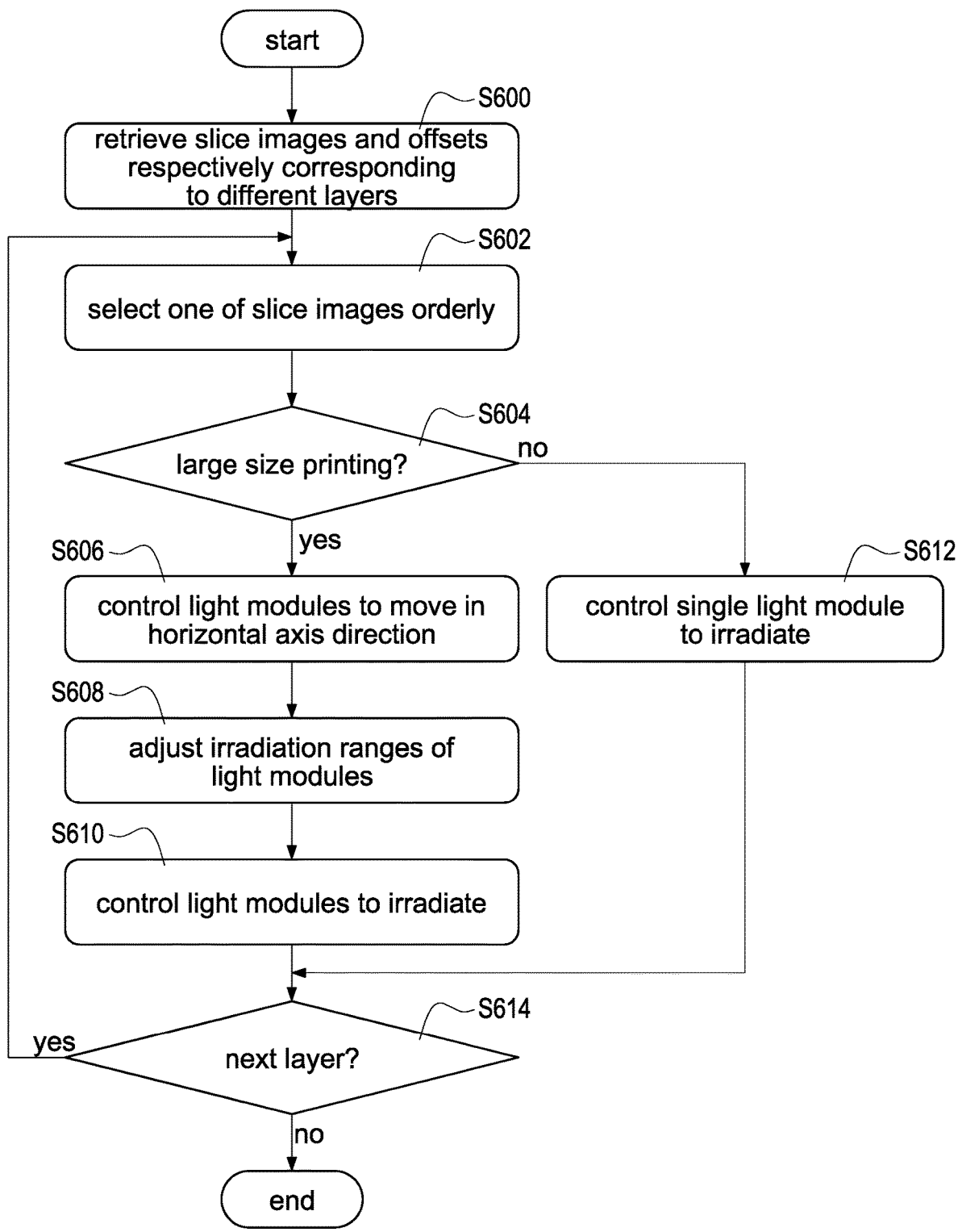
FIG. 10 is a flowchart of a stereolithography 3D printing method according to a sixth embodiment of the present disclosed example.

Please refer to FIG. 10, which is a flowchart of a stereolithography 3D printing method according to a sixth embodiment of the present disclosed example. In the embodiment shown in FIG. 10, the 3D printing method of the present disclosed example may alternatively use the single light module or the multiple light modules according to the size of the slice image for executing stereolithography 3D printing to manufacture the physical 3D model. The 3D printing method of this embodiment comprises following steps.

Step S600: control module 200 retrieves multiple layers of slice images corresponding to the 3D object data and multiple layers of offsets respectively corresponding to different layers. Each offset may respectively comprises a layer number sorted by order.

In one embodiment, each layer of the offset may comprise a plurality of horizontal offsets, the horizontal offsets respectively correspond to the sub-images of the same layer of slice image.

Step S602: control module 200 selects one of the slice images orderly, such as selecting the first layer of the slice image.

Step S604: control module 200 determines whether the large size printing is needed. More specifically, the control module 200 retrieves the maximum irradiation range of first light modules 204 (hereinafter the first maximum irradiation range) and the maximum irradiation range of second light modules 206 (hereinafter the second maximum irradiation range), and compares the first maximum irradiation range and the second maximum irradiation range with the size of the selected slice image.

If the control module 200 determines that both the first maximum irradiation range and the second maximum irradiation range are less than the size of the selected slice image, the control module 200 determines that the large size printing is needed, and executes the steps S606-S610 for simultaneously using the first light module 204 and the second light module 206 to execute the large size printing. The steps S606-S610 is same or similar as the steps S104-S108, the relevant description is omitted for brevity.

If the control module 200 determines that one of the first maximum irradiation range and the second maximum irradiation range is not less than the size of the selected slice image (take the first maximum irradiation range being not less the size of the selected slice image for example), the control module 200 determines that the general printing is needed, and executes the step S612: the control module 200 controlling the light module (take the first light module 204 for example) which its maximum irradiation range is large than the size of the slice image to irradiate according to the selected slice image for manufacturing a layer of the physical slice model (such as the first layer of the physical slice model) corresponding to the selected slice image.

Step S614: control module 200 determines whether all the slice images are printed completely.

If the control module 200 determines that all the slice images are selected and printed completely, the control module 200 determines that the printing completes, and terminates the 3D printing method.

If the control module 200 determines that any slice image is not selected and printed, the control module 200 determines that the printing doesn't complete, and continuing to execute the steps S602-S612 for selecting the other layers of the slice image (such as the second slice image) and executing the stereolithography 3D printing (such as manufacturing the second layer of physical slice model corresponding to the second layer of the slice object data).

Figure 11A:
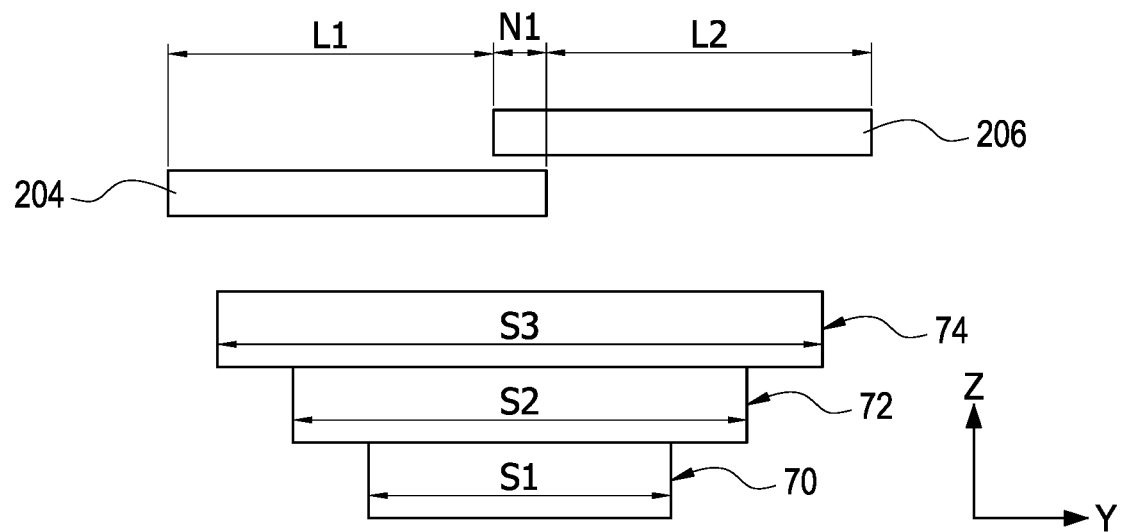
FIG. 11A is a sectional view of stereolithography 3D printing according to the present disclosed example.

Please refer to FIG. 11A, which is a sectional view of stereolithography 3D printing according to the present disclosed example. The FIG. 11A is used to explain that how the present disclosed example uses the single light module or the multiple light modules to execute the stereolithography 3D printing in the different layers alternatively.

As shown in FIG. 11A, the first maximum irradiation range of the first light module 204 is L1+N1, the second maximum irradiation range of the light module 206 is L2+N1. The irradiation range formed by overlapping the first light module 204 and the second light module 206 is L1+L2+N1, wherein L1 may be same as L2 or different from L2, but this specific example is not intended to limit the scope of the present disclosed example. Moreover, the size of the first layer of the slice image 70 (such as the width of the widest part of the slice image 70) is S1, the size of the second layer of the slice image 72 (such as the width of the widest part of the slice image 72) is S2, the size of the third layer of the slice image 76 (such as the width of the widest part of the slice image 76) is S3, wherein this example further comprises following conditions: S1<(L1+N1)<S2<S3<(L1+L2+N1); and, S1<(L2+N1)<S2<S3<(L1+L2+N1).

Because both the first maximum irradiation range which its size is L1+N1 and the second maximum irradiation range which its size is L2+N1 are larger than the size of the first layer of slice image which is S1, the control module 200 may select one of the first light module 204 and the second light module 206 to irradiate for manufacturing the first layer of the physical slice model when printing the first layer of slice image 70.

Because both the first maximum irradiation range which its size is L1+N1 and the second maximum irradiation range which its size is L2+N1 are less than the size of the second layer of slice image which is S2, the control module 200 may simultaneously control both the first light module 204 and the second light module 206 to irradiate for manufacturing the second layer of the physical slice model when printing the second layer of slice image 72.

Because both the first maximum irradiation range which its size is L1+N1 and the second maximum irradiation range which its size is L2+N1 are less than the size of the third layer of slice image which is S3, the control module 200 may simultaneously control both the first light module 204 and the second light module 206 to irradiate for manufacturing the third layer of the physical slice model when printing the third layer of slice image 74.

Figure 11B:
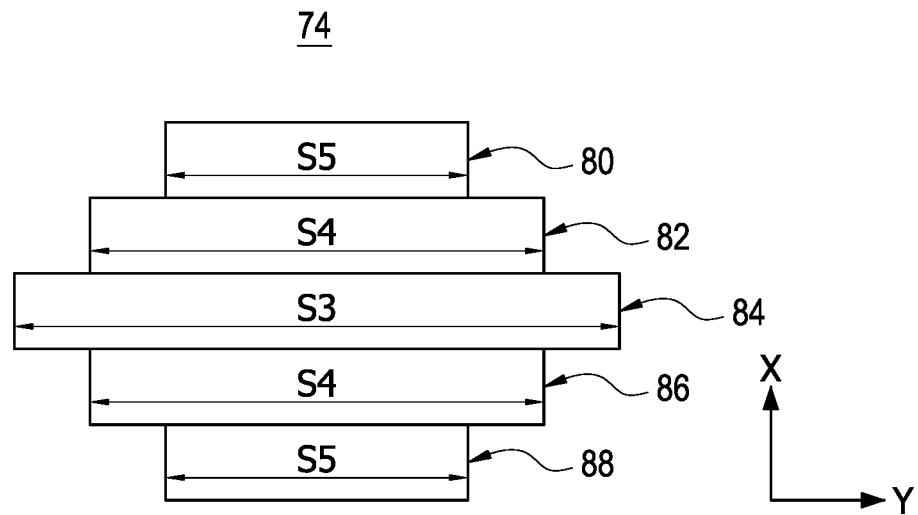
FIG. 11B is an overlooking view of stereolithography 3D printing according to the present disclosed example.

Please refer to FIG. 11B simultaneously, which is an overlooking view of stereolithography 3D printing according to the present disclosed example. The FIG. 11A is used to explain that how the present disclosed example uses the single light module or the multiple light modules to execute the stereolithography 3D printing in the same layer alternatively.

As shown in FIG. 11B, the third layer of the slice image 74 may comprise a plurality of sub-image 80-88 respectively corresponding to the different sizes, wherein the size of the sub-image 80, 88 is S5, the size of the sub-image 82, 86 is S4, the size of the sub-image 84 is S3. Moreover, this example further comprises following conditions: S5<S4<(L1+N1)<S3<(L1+L2+N1); and, S5<S4<(L2+N1)<S3<(L1+L2+N1).

As mentioned above, the control module 200 may select one of the first light module 204 and the second light module 206 (take selecting the first light module 204 for example) to irradiate when printing the first sub-image 80 of the third layer of slice image 74. The control module 200 may control the first light module 204 to irradiate when printing the second sub-image 82 of the third layer of slice image 74. The control module 200 must simultaneously control both the first light module 204 and the light module 206 to irradiate when printing the third sub-image 84 of the third layer of slice image 74. The control module 200 may control the first light module 204 to irradiate when printing the fourth sub-image 86 of the third layer of slice image 74. The control module 200 may control the first light module 204 to irradiate when printing the fifth sub-image 88 of the third layer of slice image 74.

Via using the single light module or the multiple light modules to execute the stereolithography 3D printing alternatively, the present disclosed example can effectively reduce the probability of simultaneously using multiple light modules to irradiate, and effective reduce the number of borderlines.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A stereolithography 3D printing method for multiple light modules, the stereolithography 3D printing method for multiple light modules being applied to a stereolithography 3D printer comprising a first light module and a second light module, the stereolithography 3D printing method for multiple light modules comprising following steps of:
   a) retrieving a plurality of slice images respectively corresponding to a plurality of layers of 3D object data, and a plurality of offsets respectively corresponding to the plurality of layers of the 3D object data, wherein one of the offsets has the same value as another of the offsets, and one of the offsets has a different value from another of the offsets;
   b) selecting one of the slice images;
   c) adjusting a first light irradiation range of the first light module and a second light irradiation range of the second light module according to the offset corresponding to the same layer as the selected slice image, wherein there is no overlapping light irradiation in an axis direction between the adjusted first light irradiation range and the adjusted second light irradiation range;
   d) moving the first light module and second light module along the axis direction, and controlling the first light module to irradiate based on the adjusted first light irradiation range and the second light module to irradiate based on the adjusted second light irradiation range for manufacturing the layer of a physical slice model according to the selected slice image; and
   e) executing the steps b) to the step d) repeatedly until all of the physical slice models corresponding to the 3D object data are manufactured.

2. The stereolithography 3D printing method for multiple light modules according to claim 1, wherein the step a) comprises following steps of:
   a1) retrieving the plurality of the slice images respectively corresponding to the plurality of the layers; and
   a2) executing a generating process for generating a plurality of numbers, and making the plurality of the numbers as the offsets corresponding to the plurality of the layers, respectively.

3. The stereolithography 3D printing method for multiple light modules according to claim 2, wherein the step a2) is configured to generate the plurality of the numbers within a range, wherein any two offsets respectively corresponding to two adjacent layers are different from each other.

4. The stereolithography 3D printing method for multiple light modules according to claim 1, wherein the two offsets corresponding to the two layers separated by one layer are the same as each other.

5. The stereolithography 3D printing method for multiple light modules according to claim 4, wherein the plurality of the offsets corresponding to the odd layers or the even layers are the same as each other.

6. The stereolithography 3D printing method for multiple light modules according to claim 1, wherein the plurality of the offsets corresponding to the odd layers or the even layers are decreasing or increasing based on a layer number of the corresponded layer.

7. The stereolithography 3D printing method for multiple light modules according to claim 1, wherein each offset corresponding to each layer comprises a first offset and a second offset, a sum of the first offset and the second offset corresponding to each layer is the same; wherein the step c) is configured to adjust the first light irradiation range according to the first offset and the second light irradiation range according to the second offset respectively.

8. The stereolithography 3D printing method for multiple light modules according to claim 7, wherein the step c) comprises follow steps of:
 c1) adjusting an irradiation range of a first overlapping irradiation area of the first light module according to the first offset; and
 c2) adjusting an irradiation range of a second overlapping irradiation area of the second light module according to the second offset, wherein the first overlapping irradiation area completely overlaps the second overlapping irradiation area in the axis direction, there is not overlap in the axis direction between the adjusted irradiation range of the first overlapping irradiation area and the adjusted irradiation range of the second overlapping irradiation area.

9. The stereolithography 3D printing method for multiple light modules according to claim 8, wherein the step d) comprises following steps of:
 d1) controlling a first non-overlapping irradiation area of the first light module to irradiate according to a plurality of pixel values and printing positions of a plurality of pixels of the slice image;
 d2) controlling a second non-overlapping irradiation area of the second light module to irradiate according to the pixel values and the printing positions of the plurality of the pixels of the slice image, wherein there is no overlap in the axis direction between the first non-overlapping irradiation area and the second non-overlapping irradiation area;
 d3) controlling the first overlapping irradiation area to irradiate according to the pixel value of the pixel when determining that the printing position of any pixel is within the adjusted irradiation range of the first overlapping irradiation area; and
 d4) controlling the second overlapping irradiation area to irradiate according to the pixel value of the pixel when determining that the printing position of any pixel is within the adjusted irradiation range of the second overlapping irradiation area.

10. The stereolithography 3D printing method for multiple light modules according to claim 1, wherein the step a) is configured to load an offset table, wherein the offset table records the plurality of the offsets.

* * * * *